United States Patent
Zhang et al.

(10) Patent No.: US 8,644,268 B2
(45) Date of Patent: Feb. 4, 2014

(54) TD-LTE HETNET PARTITION

(75) Inventors: Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 13/166,296

(22) Filed: Jun. 22, 2011

(65) Prior Publication Data

US 2011/0317670 A1 Dec. 29, 2011

Related U.S. Application Data

(60) Provisional application No. 61/358,804, filed on Jun. 25, 2010.

(51) Int. Cl.
*H04J 3/00* (2006.01)

(52) U.S. Cl.
USPC ......... 370/336; 455/507; 455/422.1; 455/329

(58) Field of Classification Search
USPC ........................... 370/329, 336; 455/422, 507
See application file for complete search history.

(56) References Cited

U.S. PATENT DOCUMENTS

| | | | |
|---|---|---|---|
| 2009/0046605 A1* | 2/2009 | Gao et al. | 370/280 |
| 2009/0213769 A1* | 8/2009 | Shen et al. | 370/280 |
| 2009/0257390 A1 | 10/2009 | Ji et al. | |
| 2010/0008282 A1 | 1/2010 | Bhattad et al. | |
| 2010/0128690 A1* | 5/2010 | McBeath et al. | 370/329 |
| 2010/0195587 A1* | 8/2010 | Ratasuk et al. | 370/329 |
| 2010/0317339 A1* | 12/2010 | Koc | 455/424 |
| 2011/0211503 A1* | 9/2011 | Che et al. | 370/280 |

FOREIGN PATENT DOCUMENTS

WO WO2009129413 A2 10/2009
WO WO2010049587 A1 5/2010

OTHER PUBLICATIONS

International Search Report and Written Opinion—PCT/US2011/041620, ISA/EPO—Nov. 2, 2011.

\* cited by examiner

*Primary Examiner* — Chi Pham
*Assistant Examiner* — Fahmida Chowdhury
(74) *Attorney, Agent, or Firm* — Arent Fox LLP

(57) ABSTRACT

Downlink (DL) subframes and DL hybrid automatic repeat request (HARQ) messages may be protected by time division multiplexing (TDM) partitioning. However, TDM partitioning may not be required for uplink (UL) subframes in general. For example, information carried over a physical uplink control channel (PUCCH), may be protected by frequency division multiplexing (FDM) partitioning. In fact, one UL subframe may correspond to eNBs of multiple power classes. Since TDM partitioning may be required for DL transmissions, one DL sub frame may not correspond to the eNBs of multiple power classes. For some embodiments, groups of subframes may be allocated to the different power classes. Therefore, subframes allocated to an eNB of a power class may observe reduced or no interference from eNBs of other power classes.

71 Claims, 35 Drawing Sheets

TD-LTE HETNET PARTITION

CROSS-REFERENCE TO RELATED APPLICATION

This application claims priority to U.S. Provisional Application Ser. No. 61/358,804, filed on Jun. 25, 2010, which is expressly incorporated herein by reference in its entirety.

BACKGROUND

I. Field

The present disclosure relates generally to communication and, more specifically, to techniques for supporting communication in a wireless communication network.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Downlink (DL) subframes and DL hybrid automatic repeat request (HARQ) messages may be protected by time division multiplexing (TDM) partitioning. However, TDM partitioning may not be required for uplink (UL) subframes in general. For example, information carried over a physical uplink control channel (PUCCH), may be protected by frequency division multiplexing (FDM) partitioning. In fact, one UL subframe may correspond to eNBs of multiple power classes. Since TDM partitioning may be required for DL transmissions, one DL subframe may not correspond to the eNBs of multiple power classes. For some embodiments, groups of subframes may be allocated to the different power classes. Therefore, subframes allocated to an eNB of a power class may observe reduced or no interference from eNBs of other power classes.

Certain aspects of the present disclosure provide a method for wireless communications. The method generally includes determining one or more groups of subframes, wherein each group comprises one or more downlink subframes for downlink transmissions comprising at least a downlink grant, an uplink assignment, a downlink data transmission, and an acknowledgement of an uplink transmission, and one or more uplink subframes for an acknowledgement of a downlink transmission and an uplink data transmission, and scheduling transmissions using at least one of the groups of subframes.

Certain aspects of the present disclosure provide an apparatus for wireless communications. The apparatus generally includes means for determining one or more groups of subframes, wherein each group comprises one or more downlink subframes for downlink transmissions comprising at least a downlink grant, an uplink assignment, a downlink data transmission, and an acknowledgement of an uplink transmission, and one or more uplink subframes for an acknowledgement of a downlink transmission and an uplink data transmission, and means for scheduling transmissions using at least one of the groups of subframes.

Certain aspects of the present disclosure provide an apparatus for wireless communications. The apparatus generally includes at least one processor configured to determine one or more groups of subframes, wherein each group comprises one or more downlink subframes for downlink transmissions comprising at least a downlink grant, an uplink assignment, a downlink data transmission, and an acknowledgement of an uplink transmission, and one or more uplink subframes for an acknowledgement of a downlink transmission and an uplink data transmission, and schedule transmissions using at least one of the groups of subframes.

Certain aspects provide a computer-program product for wireless communications. The computer-program product typically includes a computer-readable medium having instructions stored thereon, the instructions being executable by one or more processors. The instructions generally include code for determining one or more groups of subframes, wherein each group comprises one or more downlink sub frames for downlink transmissions comprising at least a downlink grant, an uplink assignment, a downlink data transmission, and an acknowledgement of an uplink transmission, and one or more uplink subframes for an acknowledgement of a downlink transmission and an uplink data transmission, and code for scheduling transmission using at least one of the groups of subframes.

Certain aspects of the present disclosure provide a method for wireless communications. The method generally includes receiving a grant message in a downlink subframe and, based on the downlink subframe, determining a group of subframes from multiple groups of subframes, wherein each group comprises one or more downlink subframes for downlink transmissions comprising at least a downlink grant, an uplink grant, a downlink data transmission, and an acknowledgement of an uplink transmission, and one or more uplink subframes for an acknowledgement of a downlink transmission and an uplink data transmission.

Certain aspects of the present disclosure provide an apparatus for wireless communications. The apparatus generally includes means for receiving a grant message in a downlink subframe and, based on the downlink subframe, means for determining a group of subframes from multiple groups of subframes, wherein each group comprises one or more downlink subframes for downlink transmissions comprising at least a downlink grant, an uplink grant, a downlink data transmission, and an acknowledgement of an uplink transmission, and one or more uplink subframes for an acknowledgement of a downlink transmission and an uplink data transmission.

Certain aspects of the present disclosure provide an apparatus for wireless communications. The apparatus generally includes at least one processor configured to receive a grant message in a downlink subframe and, based on the downlink subframe, determine a group of subframes from multiple groups of subframes, wherein each group comprises one or more downlink subframes for downlink transmissions comprising at least a downlink grant, an uplink grant, a downlink data transmission, and an acknowledgement of an uplink transmission, and one or more uplink subframes for an acknowledgement of a downlink transmission and an uplink data transmission.

Certain aspects provide a computer-program product for wireless communications. The computer-program product typically includes a computer-readable medium having instructions stored thereon, the instructions being executable by one or more processors. The instructions generally include code for receiving a grant message in a downlink subframe and, based on the downlink subframe, code for determining a group of subframes from multiple groups of subframes, wherein each group comprises one or more downlink subframes for downlink transmissions comprising at least a downlink grant, an uplink grant, a downlink data transmission, and an acknowledgement of an uplink transmission, and one or more uplink subframes for an acknowledgement of a downlink transmission and an uplink data transmission.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
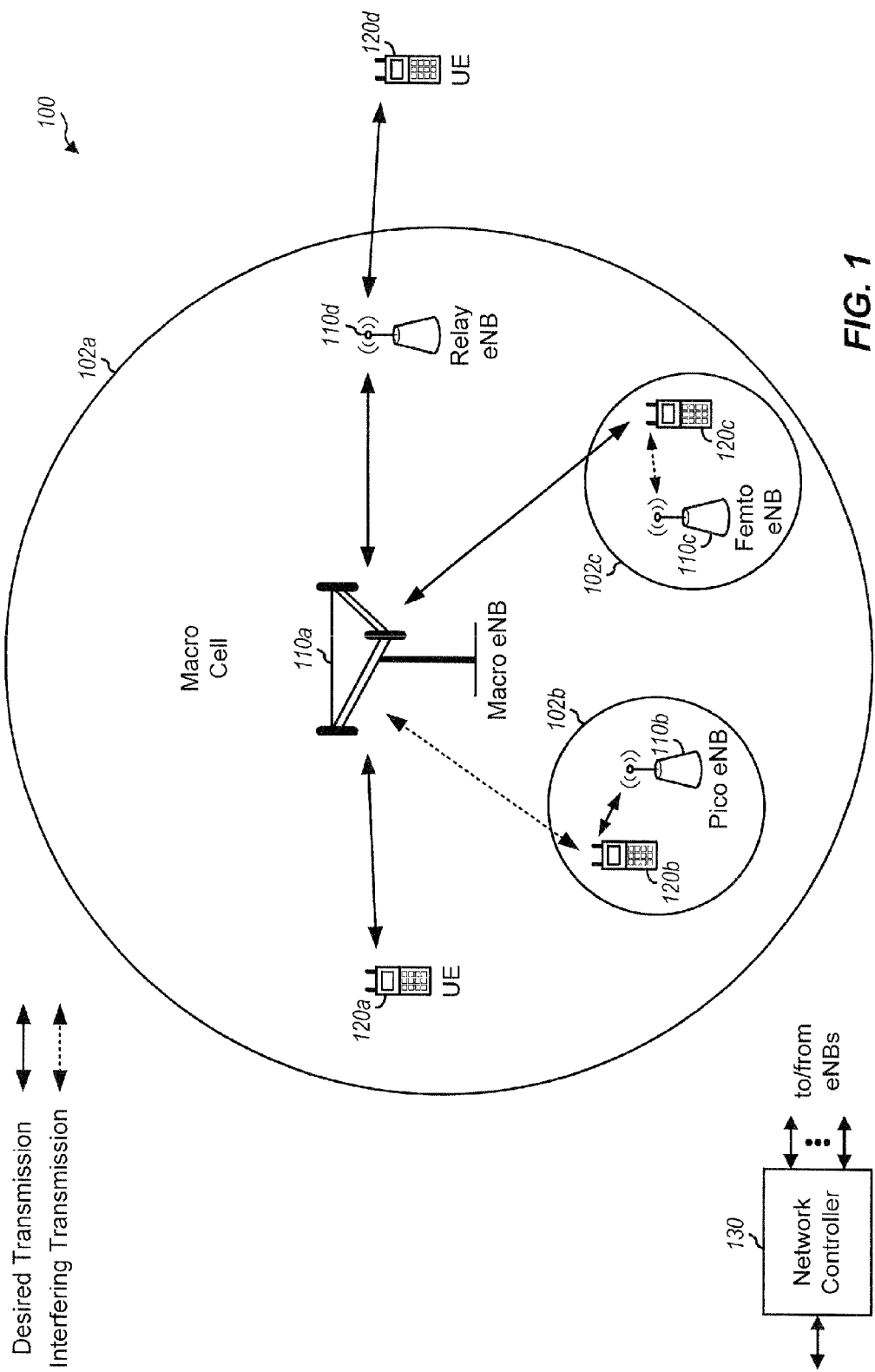
FIG. 1 is a block diagram conceptually illustrating an example of a wireless communications network in accordance with certain aspects of the present disclosure.

FIG. 1 shows a wireless communication network 100 in which procedures described for determining one or more groups of subframes may be performed. The network 100 may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

As will be described in greater detail below, according to certain aspects, eNBs may perform inter-cell interference coordination (ICIC). ICIC may involve negotiation between eNBs to achieve resource coordination/partitioning to allocate resources to an eNB located near the vicinity of a strong interfering eNB. The interfering eNB may avoid transmitting on the allocated/protected resources, possibly except for a CRS. A UE can then communicate with the eNB on the protected resources in the presence of the interfering eNB and may observe no interference (possibly except for the CRS) from the interfering eNB UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
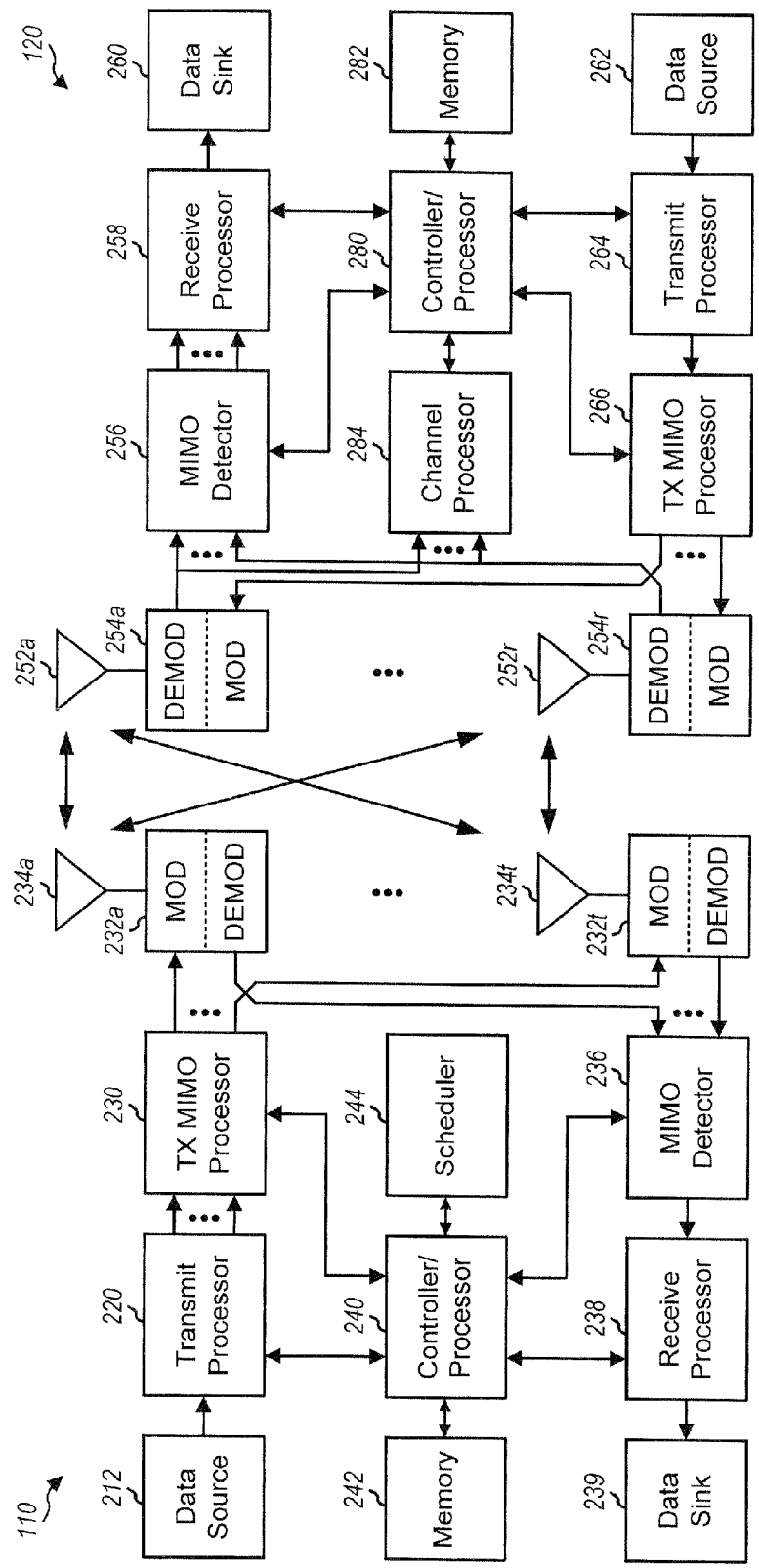
FIG. 2 shows a block diagram conceptually illustrating an example of a Node B in communication with a user equipment device (UE) in a wireless communications network in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor 284 may determine RSRP, RSSI, RSRQ, CQI, etc., as described below.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 240 and/or other processors and modules at base station 110 may perform or direct operations for configuring a UE for various random access procedures and identify one or more attributes during such procedures, as described herein. For example, processor 280 and/or other processors and modules at UE 120 may perform or direct operations for various random access procedures described herein. Memories 242 and 282 may store data and program codes for base station 110 and UE 120, respectively. A scheduler 244 may schedule UEs for data transmission on the downlink and/or uplink.

Figure 3:
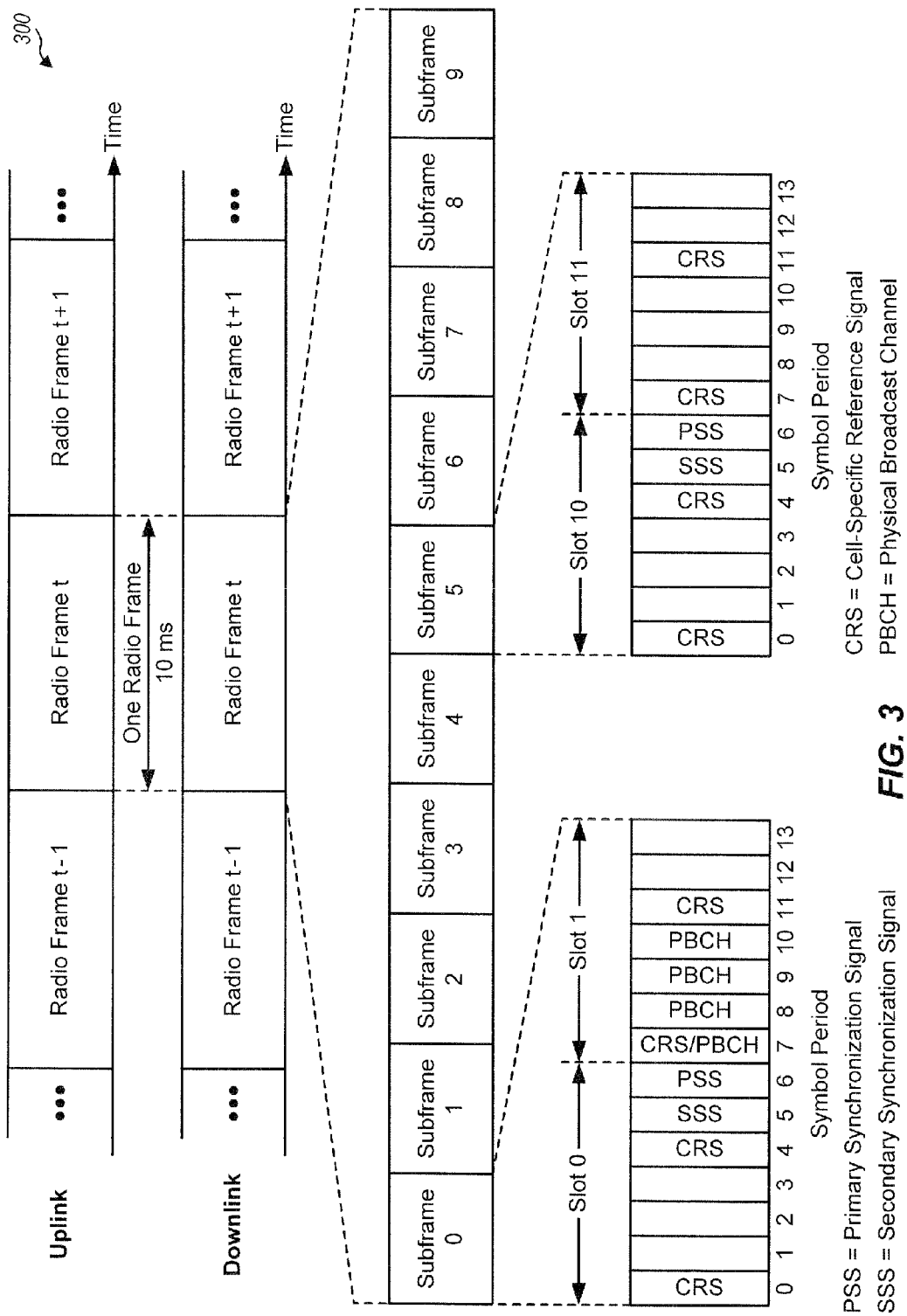
FIG. 3 is a block diagram conceptually illustrating an example of a frame structure in a wireless communications network in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBS) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q q+2Q, etc., where $q \in \{0, \ldots, Q-1\}$.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Figure 4:
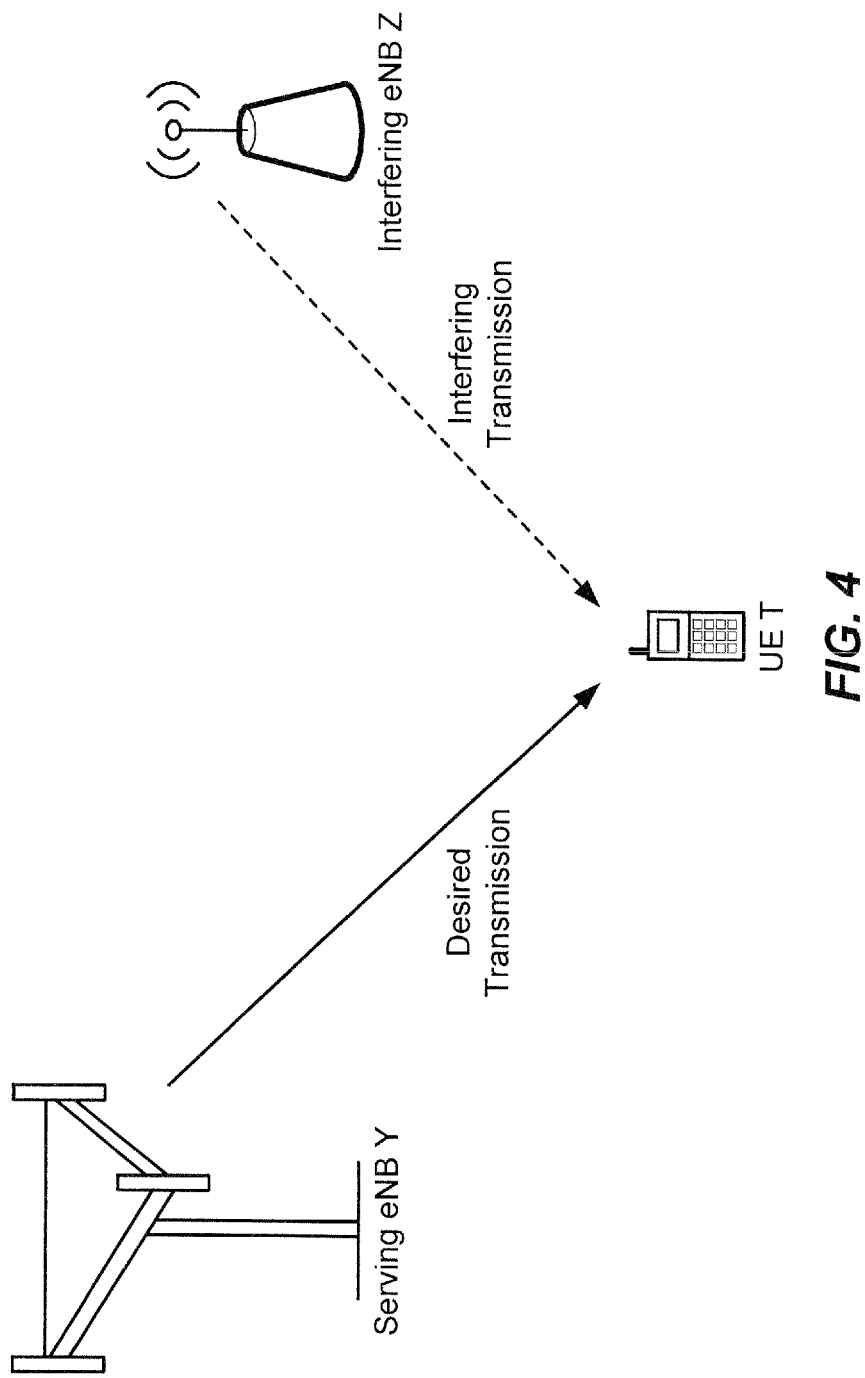
FIG. 4 illustrates an exemplary dominant interference scenario in accordance with certain aspects of the present disclosure.

FIG. 4 shows an exemplary dominant interference scenario. In the example shown in FIG. 4, a UE T may communicate with a serving eNB Y and may observe high interference from a strong/dominant interfering eNB Z.

In general, a UE may be located within the coverage of any number of eNBs. One eNB may be selected to serve the UE, and the remaining eNBs may be interfering eNBs. The UE may thus have any number of interfering eNBs. For clarity, much of the description assumes the scenario shown in FIG. 4 with one serving eNB Y and one interfering eNB Z.

A dominant interference scenario may occur due to restricted association. For example, in FIG. 4, eNB Y may be a macro eNB, and eNB Z may be a femto eNB. UE T may be located close to femto eNB Z and may have high received power for eNB Z. However, UE T may not be able to access femto eNB Z due to restricted association and may then connect to macro eNB Y with lower received power. UE T may then observe high interference from femto eNB Z on the downlink and may also cause high interference to femto eNB Z on the uplink.

A dominant interference scenario may also occur due to range extension, which is a scenario in which a UE connects to an eNB with lower path loss and possibly lower SINR among all eNBs detected by the UE. For example, in FIG. 4, eNB Y may be a pico eNB, and interfering eNB Z may be a macro eNB. UE T may be located closer to pico eNB Y than macro eNB Z and may have lower path loss for pico eNB Y. However, UE T may have lower received power for pico eNB Y than macro eNB Z due to a lower transmit power level of pico eNB Y as compared to macro eNB Z. Nevertheless, it may be desirable for UE T to connect to pico eNB Y due to the lower path loss. This may result in less interference to the wireless network for a given data rate for UE T.

Communication in a dominant interference scenario may be supported by performing inter-cell interference coordination (ICIC). According to certain aspects of ICIC, resource coordination/partitioning may be performed to allocate resources to an eNB located near the vicinity of a strong interfering eNB. The interfering eNB may avoid transmitting on the allocated/protected resources, possibly except for a CRS. A UE can then communicate with the eNB on the protected resources in the presence of the interfering eNB and may observe no interference (possibly except for the CRS) from the interfering eNB.

In general, time and/or frequency resources may be allocated to eNBs via resource partitioning. According to certain aspects, the system bandwidth may be partitioned into a number of subbands, and one or more subbands may be allocated to an eNB. In another design, a set of subframes may be allocated to an eNB. In yet another design, a set of resource blocks may be allocated to an eNB. For clarity, much of the description below assumes a time division multiplex (TDM) resource partitioning design in which one or more interlaces may be allocated to an eNB. The subframes of the allocated interlace(s) may observe reduced or no interference from strong interfering eNBs.

Figure 5:
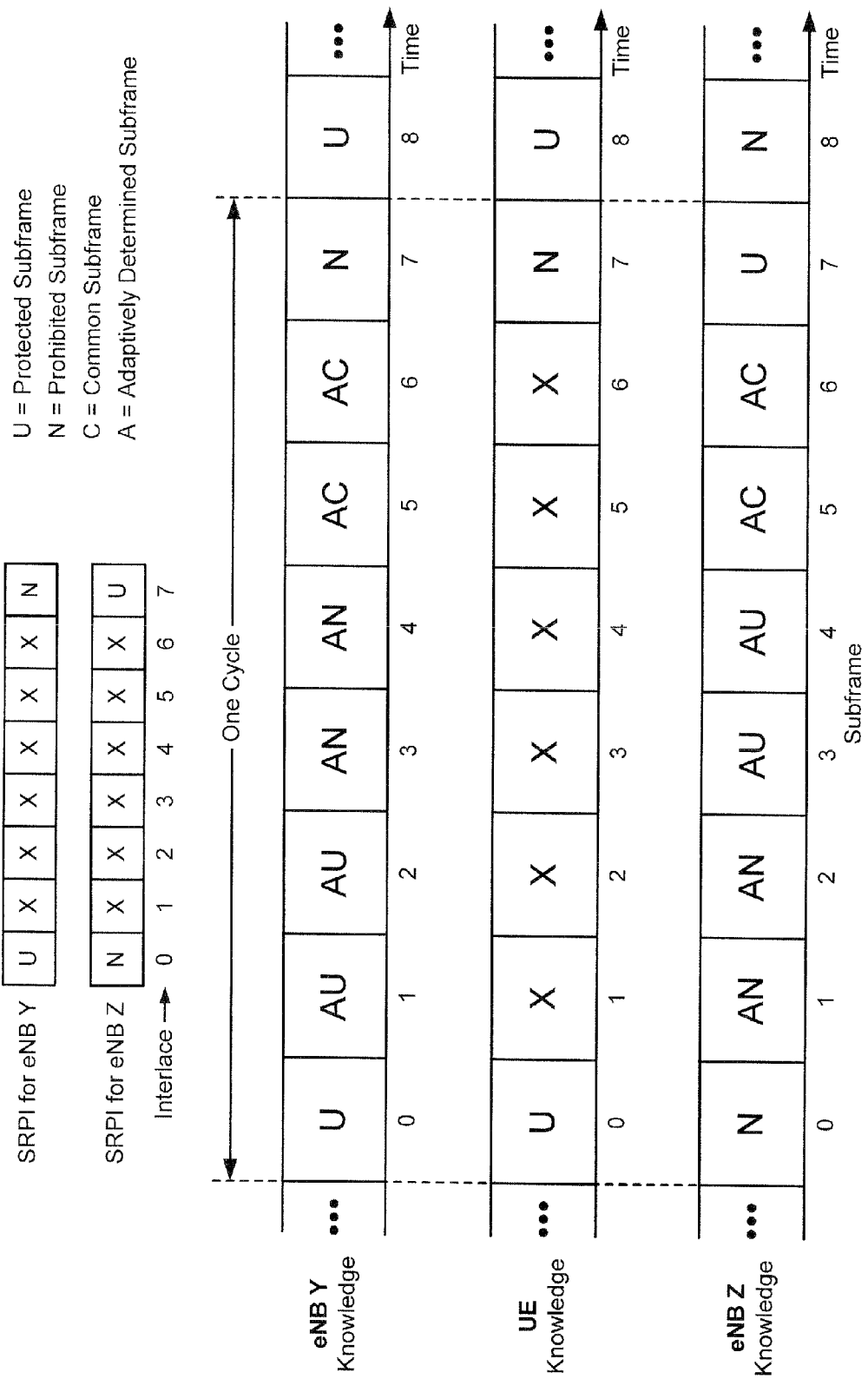
FIG. 5 illustrates example cooperative partitioning of subframes in a heterogeneous network in accordance with certain aspects of the present disclosure.

FIG. 5 shows an example of TDM resource partitioning to support communication in the dominant interference scenario in FIG. 4. In the example shown in FIG. 5, eNB Y may be allocated interlace 0, and eNB Z may be allocated interlace 7 in a semi-static or static manner, e.g., via negotiation between the eNBs through the backhaul. eNB Y can transmit data in subframes of interlace 0 and may avoid transmitting data in subframes of interlace 7. Conversely, eNB Z can transmit data in subframes of interlace 7 and may avoid transmitting data in subframes of interlace 0. The subframes of the remaining interlaces 1 through 6 may be adaptively/dynamically allocated to eNB Y and/or eNB Z.

Table 1 lists different types of subframes in accordance with one design. From the perspective of eNB Y, an interlace allocated to eNB Y may include "protected" subframes (U subframes) that can be used by eNB Y and having little or no interference from interfering eNBs. An interlace allocated to another eNB Z may include "prohibited" subframes (N subframes) that cannot be used by eNB Y for data transmission. An interlace not allocated to any eNB may include "common". subframes (C subframes) that can be used by different eNBs. A subframe that is adaptively allocated is denoted with an "A" prefix and may be a protected subframe (AU subframe), or a prohibited subframe (AN subframe), or a common subframe (AC subframe). The different types of subframes may also be referred to by other names. For example, a protected subframe may be referred to as a reserved subframe, an allocated subframe, etc.

TABLE 1

Subframe Types

| Subframe Type | Description | Expected CQI |
|---|---|---|
| U | Protected subframe that can be used for data transmission and having reduced or no interference from interfering eNBs. | High CQI |
| N | Prohibited subframe that cannot be used for data transmission. | Low CQI |
| C | Common subframe that can be used for data transmission by different eNBs. | High or Low CQI |

According to certain aspects, an eNB may transmit static resource partitioning information (SRPI) to its UEs. According to certain aspects, the SRPI may comprise Q fields for the Q interlaces. The field for each interlace may be set to "U" to indicate the interlace being allocated to the eNB and including U subframes, or to "N" to indicate the interlace being allocated to another eNB and including N subframes, or to "X" to indicate the interlace being adaptively allocated to any eNB and including X subframes. A UE may receive the SRPI from the eNB and can identify U subframes and N subframes for the eNB based on the SRPI. For each interlace marked as "X" in the SRPI, the UE may not know whether the X subframes in that interlace will be AU subframes, or AN subframes, or AC subframes. The UE may know only the semi-static part of the resource partitioning via the SRPI whereas the eNB may know both the semi-static part and adaptive part of the resource partitioning. In the example shown in FIG. 5, the SRPI for eNB Y may include "U" for interlace 0, "N" for interlace 7, and "X" for each remaining interlace. The SRPI for eNB Z may include "U" for interlace 7, "N" for interlace 0, and "X" for each remaining interlace.

A UE may estimate received signal quality of a serving eNB based on a CRS from the serving eNB. The UE may determine CQI based on the received signal quality and may report the CQI to the serving eNB. The serving eNB may use the CQI for link adaptation to select a modulation and coding scheme (MCS) for data transmission to the UE. Different types of subframes may have different amounts of interference and hence may have very different CQIs. In particular, protected subframes (e.g., U and AU subframes) may be characterized by better CQI since dominant interfering eNBs do not transmit in these subframes. In contrast, CQI may be much worse for other subframes (e.g., N, AN and AC subframes) in which one or more dominant interfering eNBs can transmit. From the point of view of CQI, AU subframes may be equivalent to U subframes (both are protected), and AN subframes may be equivalent to N subframes (both are prohibited). AC subframes may be characterized by a completely different CQI. To achieve good link adaptation performance, the serving eNB should have relatively accurate CQI for each subframe in which the eNB transmits traffic data to the UE.

TD-LTE HetNet Partition

Downlink (DL) subframes and DL hybrid automatic repeat request (HARQ) messages may be protected by time division multiplexing (TDM) partitioning. However, TDM partitioning may not be required for uplink (UL) subframes in general. For example, information carried over a physical uplink control channel (PUCCH) (e.g., an UL acknowledgment/negative acknowledgement (ACK/NAK)), may be protected by frequency division multiplexing (FDM) partitioning. In fact, one UL subframe may correspond to eNBs of multiple power classes. A scheduler may schedule PUSCH/SRS (sounding reference signals) for different power classes sent on orthogonal resources. Since TDM partitioning may be required for DL transmissions, one DL subframe may not correspond to the eNBs of multiple power classes. For some embodiments, groups of subframes may be allocated to the different power classes. Therefore, subframes allocated to an eNB of a power class may observe reduced or no interference from eNBs of other power classes.

Figures 6, 7:
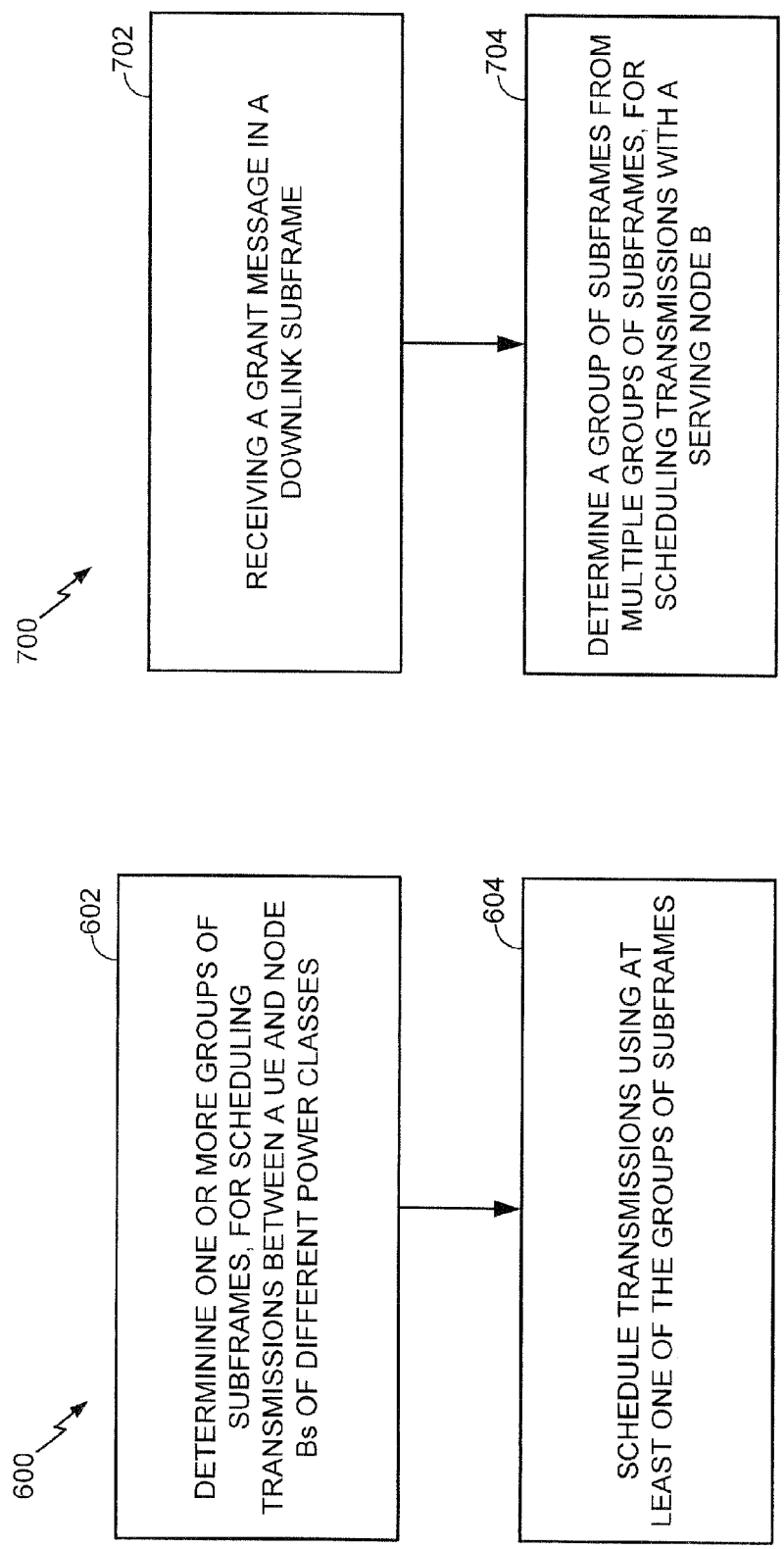
FIGS. 6-7 illustrate example operations for determining one or more groups of subframes to schedule transmissions between Node Bs and a UE, in accordance with certain aspects of the present disclosure.

FIG. 6 illustrates example operations 600 for determining one or more groups of subframes for different power classes, in accordance with certain aspects of the present disclosure. The operations 600 may be performed, for example, by a serving eNB.

At 602, the serving eNB may determine one or more groups of subframes, wherein each group comprises one or more downlink subframes for downlink transmissions comprising at least a downlink grant, an uplink assignment, a downlink data transmission, and an acknowledgement of an uplink transmission, and one or more uplink subframes for an acknowledgement of a downlink transmission and an uplink data transmission. The uplink and downlink subframes may occupy overlapping frequency ranges. For some embodiments, the one or more groups of subframes may be determined based, at least in part, on resource partitioning information (RPI) that identifies subframes that are usable by the UE and protected due to cooperative partitioning of resources between the serving eNB and one or more non-serving eNBs.

At 604, the serving eNB may transmit a grant message to the UE to schedule transmissions with the UE using at least one of the groups of subframes. For some embodiments, the serving eNB may transmit a grant message for retransmission of uplink data on the same one or more uplink subframes.

FIG. 7 illustrates example operations 700 for determining a group of sub frames in which a UE may observe reduced or no interference from non-serving eNBs of other power classes. The operations 700 may be performed, for example, by the UE.

At 702, the UE may receive a grant message in a downlink subframe.

At 704, based on the downlink subframe, the UE may determine a group of subframes from multiple groups of subframes, for scheduling transmissions with a serving eNB. Each group may comprise one or more downlink subframes for downlink transmissions comprising at least a downlink grant, an uplink grant, a downlink data transmission, and an acknowledgement of an uplink transmission, and one or more uplink subframes for an acknowledgement of a downlink transmission and an uplink data transmission.

Figure 8:
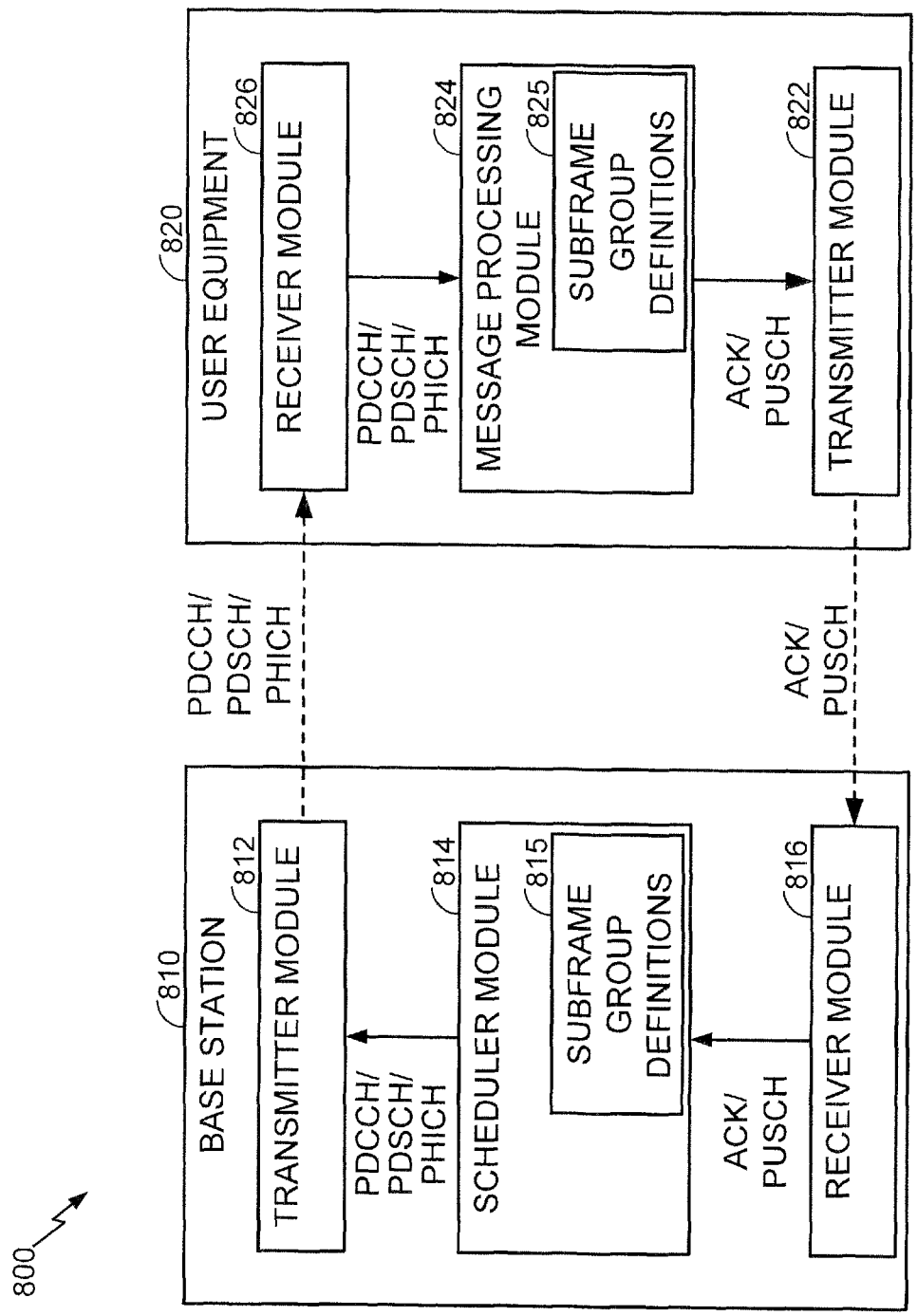
FIG. 8 illustrates an example system with a base station (BS) and a UE, capable of determining one or more groups of subframes to schedule transmissions between Node Bs and a UE, in accordance with certain aspects of the present disclosure.

FIG. 8 illustrates an example system 800 with a base station (BS) 810 (e.g., serving eNB) and UE 820, capable of determining one or more groups of subframes to schedule transmissions between eNBs and the UE 820, in accordance with certain aspects of the present disclosure. As illustrated, the BS 810 may include a scheduler module 814 for scheduling one or more messages (e.g., PDCCH/PDSCH/PHICH), wherein the message may be transmitted in a downlink subframe, via a transmitter module 812, to the UE 820. When scheduling a message, the BS 810 may refer to subframe group definitions 815 to determine the group of subframes for scheduling the transmissions with the UE, wherein the group comprises the downlink subframe.

The UE 820 may receive the message via a receiver module 826 and process the messages via a message processing module 824. From referring to the subframe group definitions 825, the UE 820 may determine the group of subframes, wherein the group comprises the downlink subframe and one or more uplink subframes to schedule transmissions with the BS 810. An acknowledgment may be generated by the UE 820 and transmitted, via a transmitter module 822, to the BS 810 in one of the one or more uplink subframes. The acknowledgment is received by the receiver module 816 of the BS 810.

Figure 9A:
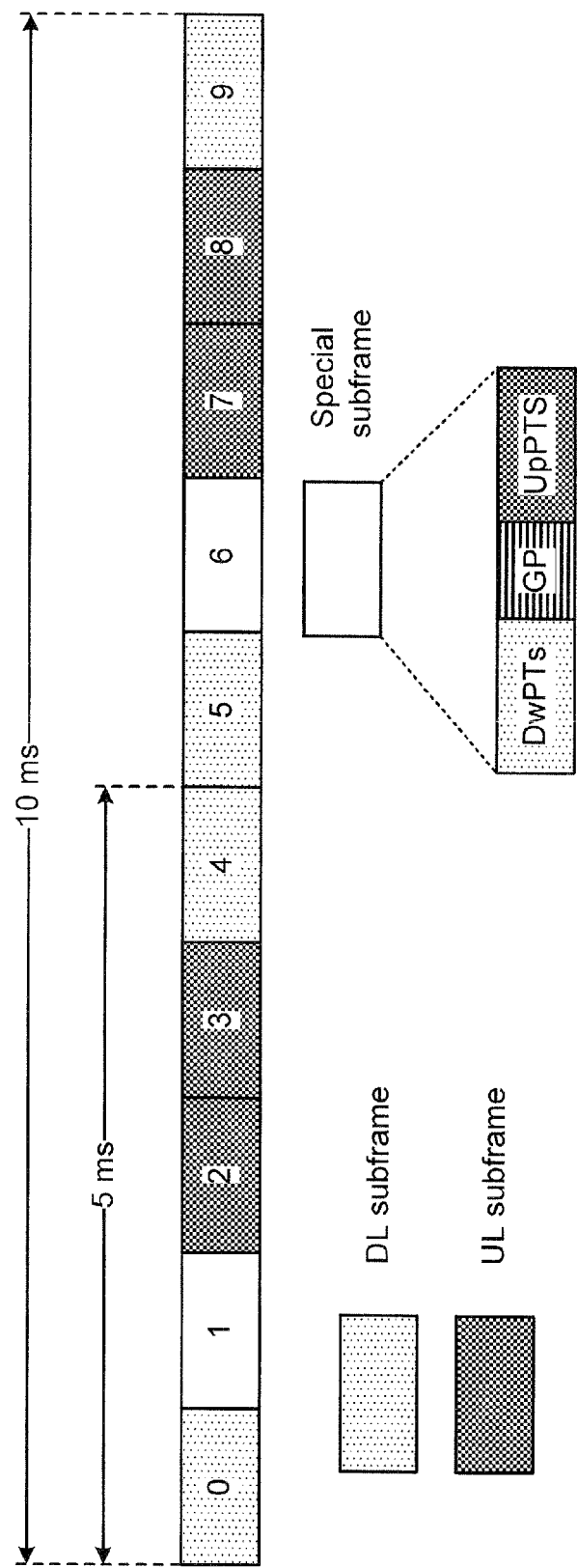
FIGS. 9A-E illustrate the TDM partitioning of a radio frame comprising four DL subframes, four UL subframes, and two special subframes, in accordance with certain aspects of the present disclosure.
Figure 9B:
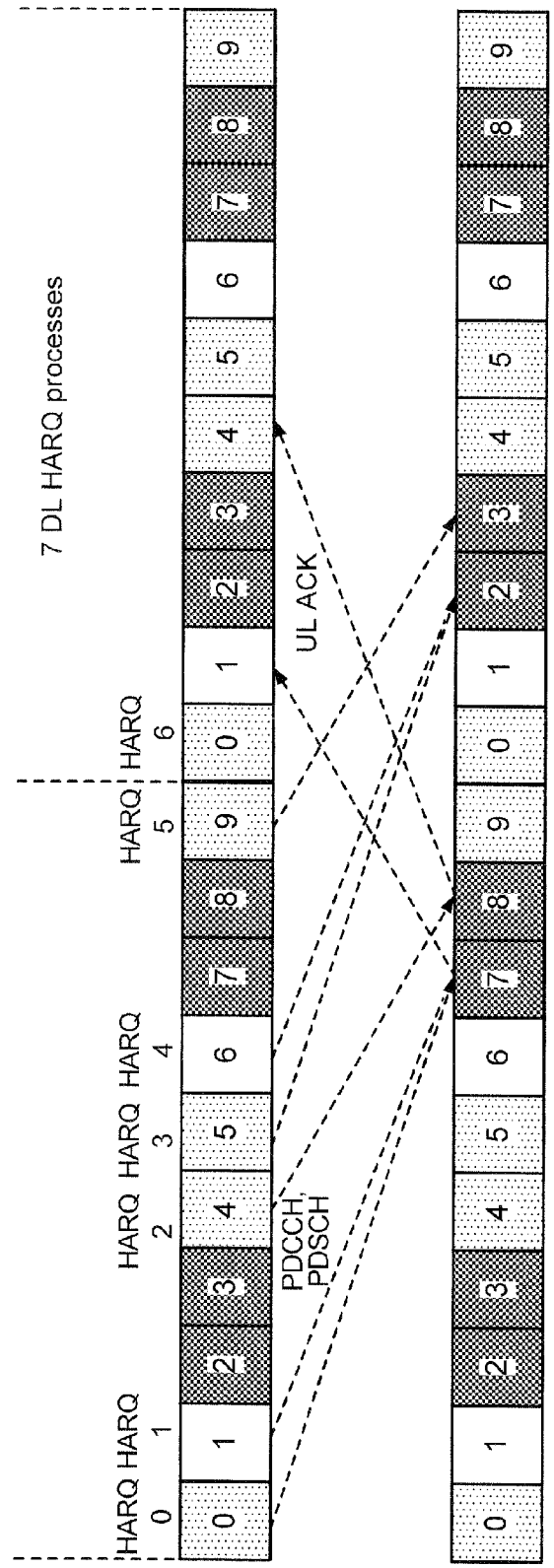

FIGS. 9A-E illustrate the TDM partitioning of a radio frame comprising four DL subframes (e.g., subframes 0, 4-5, and 9), four UL subframes (e.g., subframes 2-3 and 7-8), and two special subframes (e.g., subframes 1 and 6), in accordance with certain aspects of the present disclosure. FIG. 9B illustrates DL HARQ processes between one or more eNBs and a UE, utilizing the radio frame illustrated in FIG. 9A, in accordance with certain aspects of the present disclosure. For some embodiments, 3 ms processing time may be honored. For example, for downlink transmission in subframe 1 (e.g., PDCCH/PDSCH), the soonest subframe that may be used for acknowledgment (i.e., after 3 ms) is subframe 5. However, since subframe 5 is a DL subframe, UL subframe 7 may be used for acknowledgment (e.g., UL ACK) since subframe 7 is the next UL subframe after DL subframe 5.

Figure 9C:
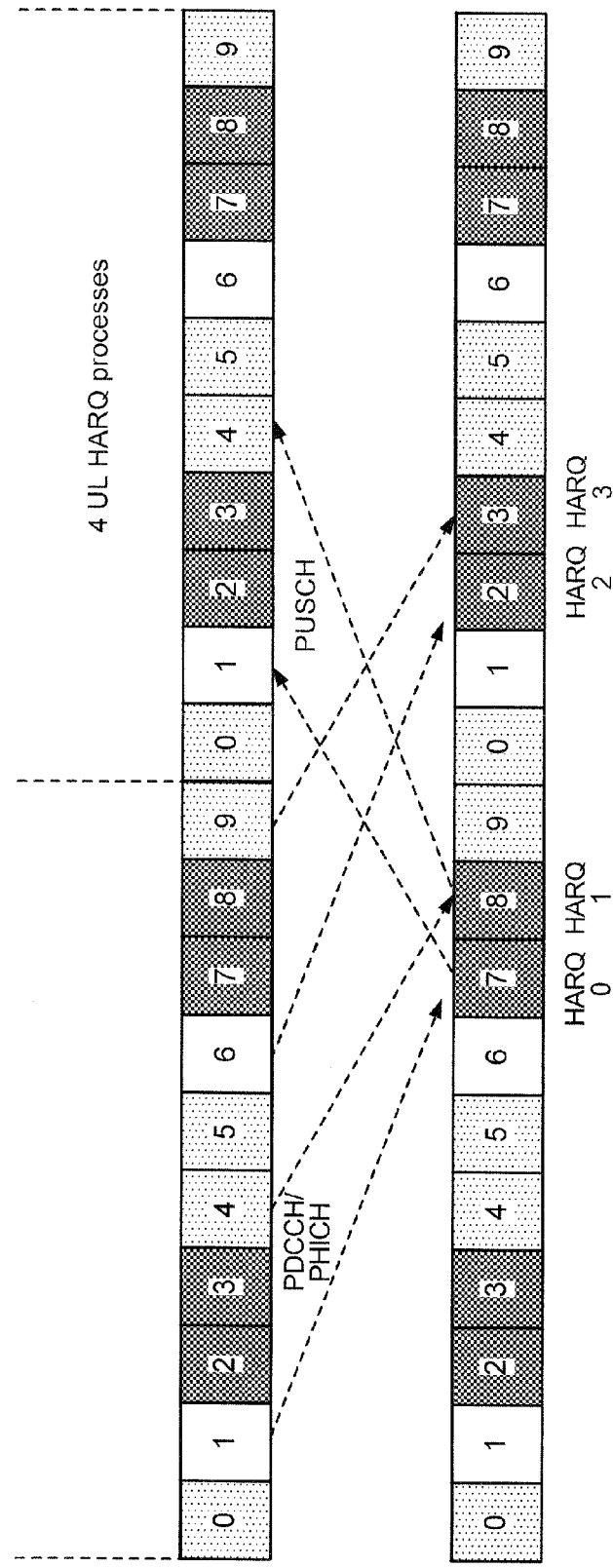

FIG. 9C illustrates UL HARQ processes between one or more eNBs and a UE, utilizing the radio frame illustrated in FIG. 9A, in accordance with certain aspects of the present disclosure. As described above, 3 ms processing time may be honored. For example, in special subframe 1, an eNB may request for transmission/retransmission (e.g., PDCCH/PHICH) of UL transmissions (e.g., PUSCH) in UL subframe 7.

Figure 9D:
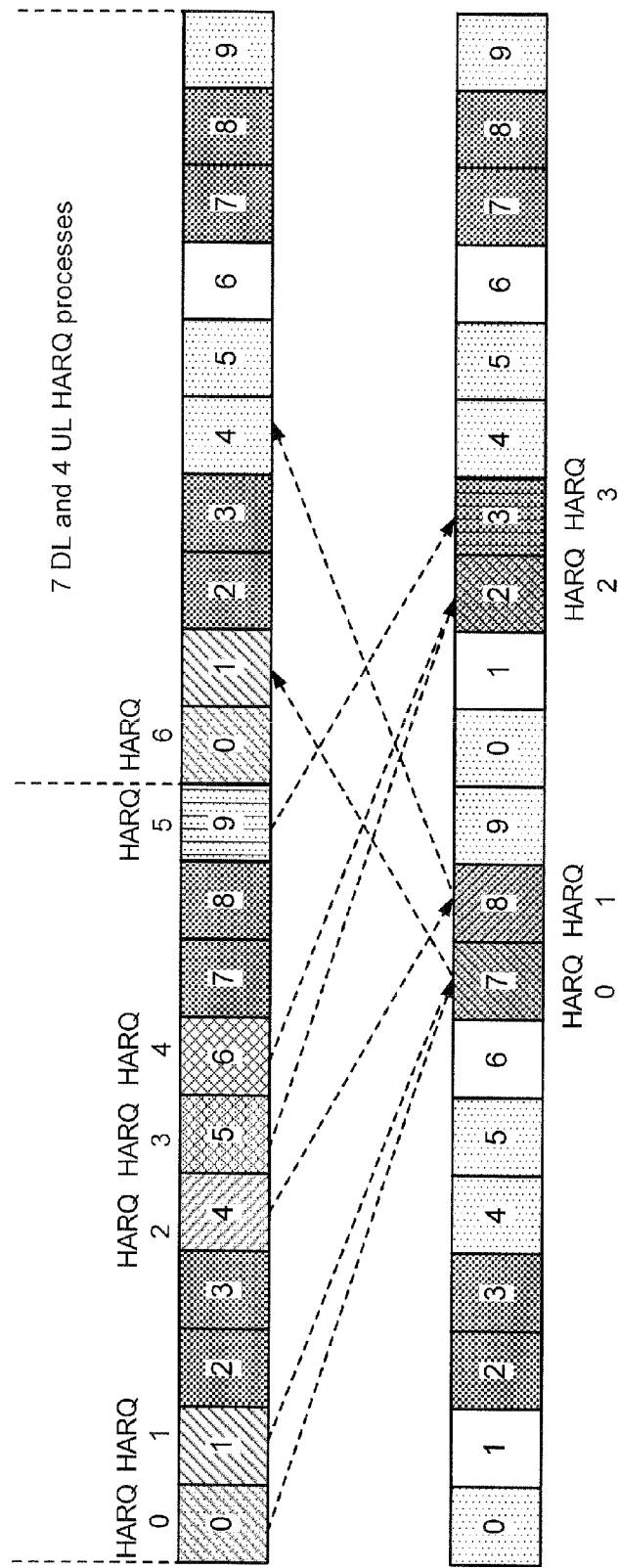

FIG. 9D illustrates the HARQ message exchanges described above, between the one or more eNBs and the UE, in accordance with certain aspects of the present disclosure. Downlink subframes 0 and 5 may not be able to send any UL grants. If subframes 0 or 5 belong to a power class, subframe 0 or 5 may need to be bundled together with some other DL subframe so that the power class may have a corresponding PUSCH transmission. To ensure that each power class has a corresponding PUSCH transmission, subframe 0 may be bundled with subframe 1 while 5 may be bundled with 6.

Referring to FIGS. 9B-C, since UL subframes acknowledge and receive PHICH/PDCCH assignments from the same DL subframe (e.g., between DL subframe 1 and UL subframe 7), TDM partitioning may be available in both downlink and uplink. For example, four possible groups of subframes for HARQ message exchanges between one or more eNBs and a UE (i.e., backward compatible—UL HARQ timing wise) may comprise: Group 1: {0, 1, 7}; Group 2: {5, 6, 2}; Group 3: {4, 8}; and Group 4: {9, 3}, as illustrated in FIG. 9D. For some embodiments, each group may correspond to a different power class. When there are fewer power classes, any of these four groups may be grouped together. Subframe 5 in each even radio frame may always belong to the same power class, hence either cross subframe signaling or PDCCH less operation may be required for system information block (SIB1) decoding.

Figure 9E:
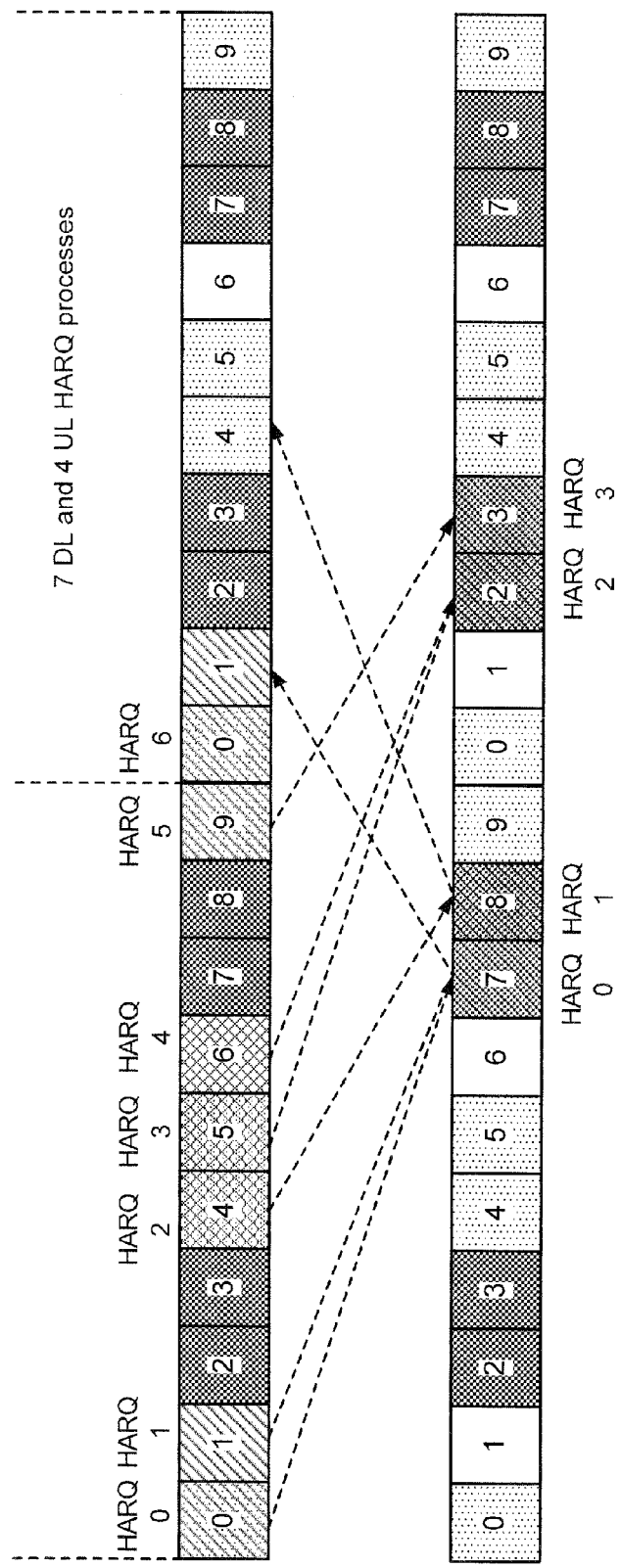

FIG. 9E illustrates HARQ message exchanges between one or more eNBs and a UE for downlink and uplink when two groups of subframes may be required, in accordance with certain aspects of the present disclosure. Partition 1 may comprise subframes {9, 0, 1, 3, 7} and partition 2 may comprise subframes {4, 5, 6, 2, 8} (i.e., a 5:5 ratio). For some embodiments, partition 1 may comprise subframes {0, 1, 7} for class 1 and the remaining subframes for class 2 (i.e., a 7:3 ratio). For some embodiments, partition 1 may comprise subframes {0, 1, 5, 6, 7, 2} for class 1 and the remaining subframes for class 2 (i.e., a 6:4 ratio). For some embodiments, partition 1 may comprise subframes {9, 0, 1, 5, 6, 7, 2, 3} for class 1 and subframes {8, 4} for class 2 (i.e., a 8:2 ratio).

When more partitions are needed, the DL subframes may be partitioned with a longer partition period (e.g., by using multiple radio frames). For example, in radio frame N, the following groups may be partitioned: Group 1: {0, 1, 7}; Group 2: {5, 6, 2}; Group 3: {4, 8}; and Group 4: {9, 3}, as described above. Further, in radio frame N+1, the following groups may be partitioned: Group 5: {0, 1, 7}; Group 6: {5, 6, 2}; Group 7: {4, 8}; and Group 8: {9, 3}. The UL HARQ timing may be suspended by SIB configuration (e.g., suspend UL HARQ every other radio frame). For example, UL HARQ messages may be suspended when UL transmission of a first group (e.g., from radio frame N) falls into a second group (e.g., from radio frame N+1).

Figure 10A:
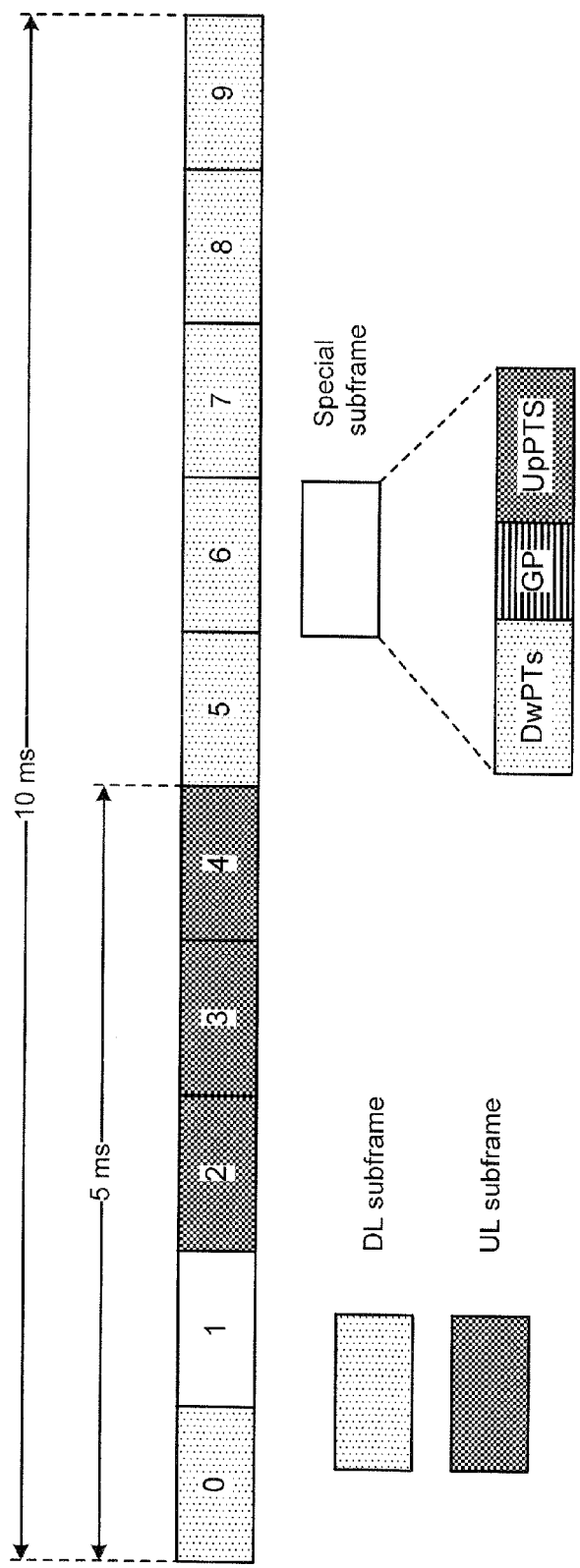
FIGS. 10A-D illustrate the partitioning of a radio frame comprising six DL subframes, three UL subframes, and one special subframe, in accordance with certain aspects of the present disclosure.
Figure 10B:
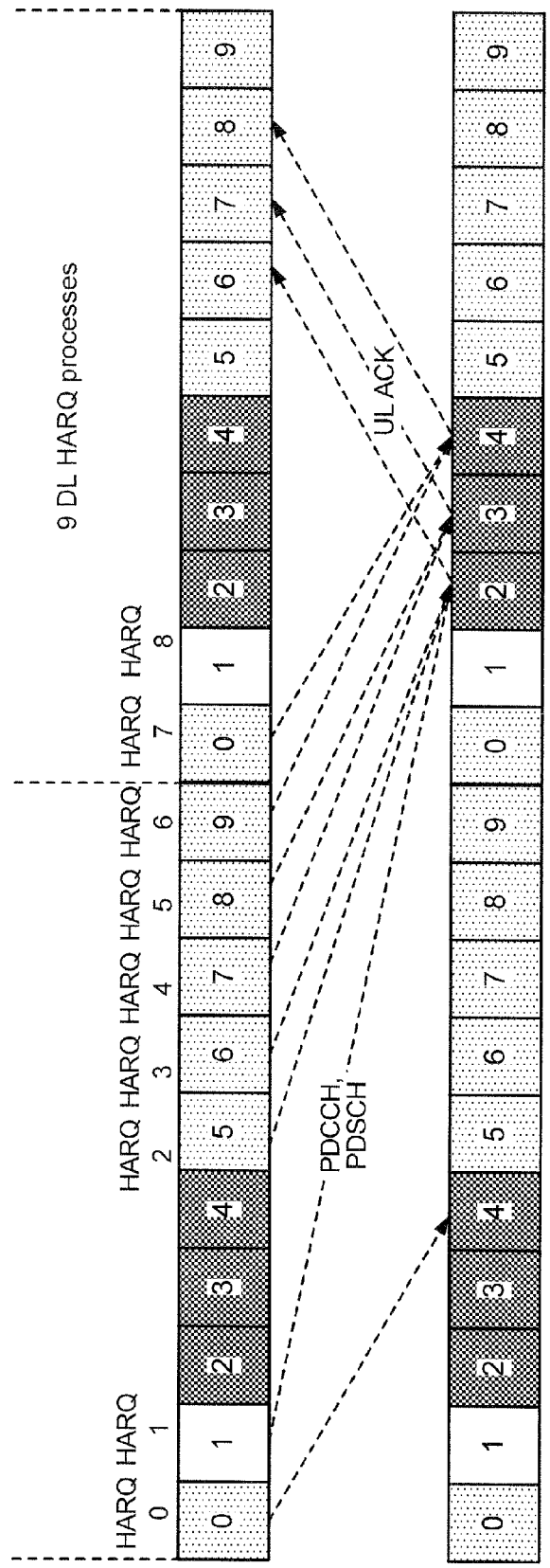
Figure 10C:
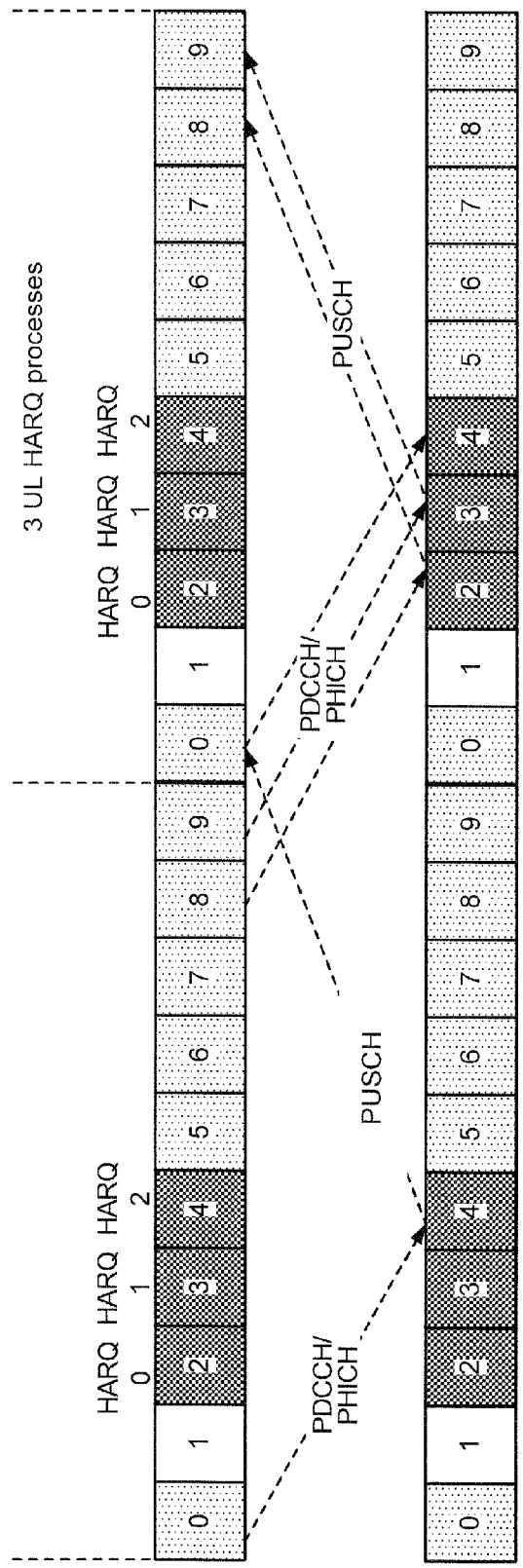

FIGS. 10A-D illustrate the partitioning of a radio frame comprising six DL subframes (e.g., subframes 0 and 5-9), three UL subframes (e.g., subframes 2-4), and one special subframe (e.g., subframe 1), in accordance with certain aspects of the present disclosure. FIG. 10B illustrates DL HARQ processes between one or more eNBs and a UE, utilizing the radio frame illustrated in FIG. 10A, in accordance with certain aspects of the present disclosure. For some embodiments, 3 ms processing time may be honored, as described above. Subframe 2 may acknowledge (ACK) three DL subframes while subframes 3 and 4 may each ACK two DL subframes, as illustrated in FIG. 10B. FIG. 10C illustrates UL HARQ processes between the one or more eNBs and the UE, utilizing the radio frame illustrated in FIG. 10A, in accordance with certain aspects of the present disclosure.

Referring to FIGS. 10B-C, since UL subframes have different corresponding DL subframes to ACK and receive PHICH/PDCCH assignments, TDM partitioning may not be available in UL. For example, UL subframe 3 may ACK a message from DL subframe 8, as illustrated in FIG. 10B. However, referring to FIG. 10C, DL subframe 8 may acknowledge UL transmissions in UL subframe 2. Therefore, allowing TDM partitioning in UL may not allow for the partitioning of the subframes into multiple groups. As a result, UL may rather be protected by FDM partitioning, with eNB coordination. In other words, an UL subframe in a first group may ACK a DL subframe in a second group. In addition, more groups may be formed with a longer partition period, with UL HARQ suspension, as described above.

Figure 10D:
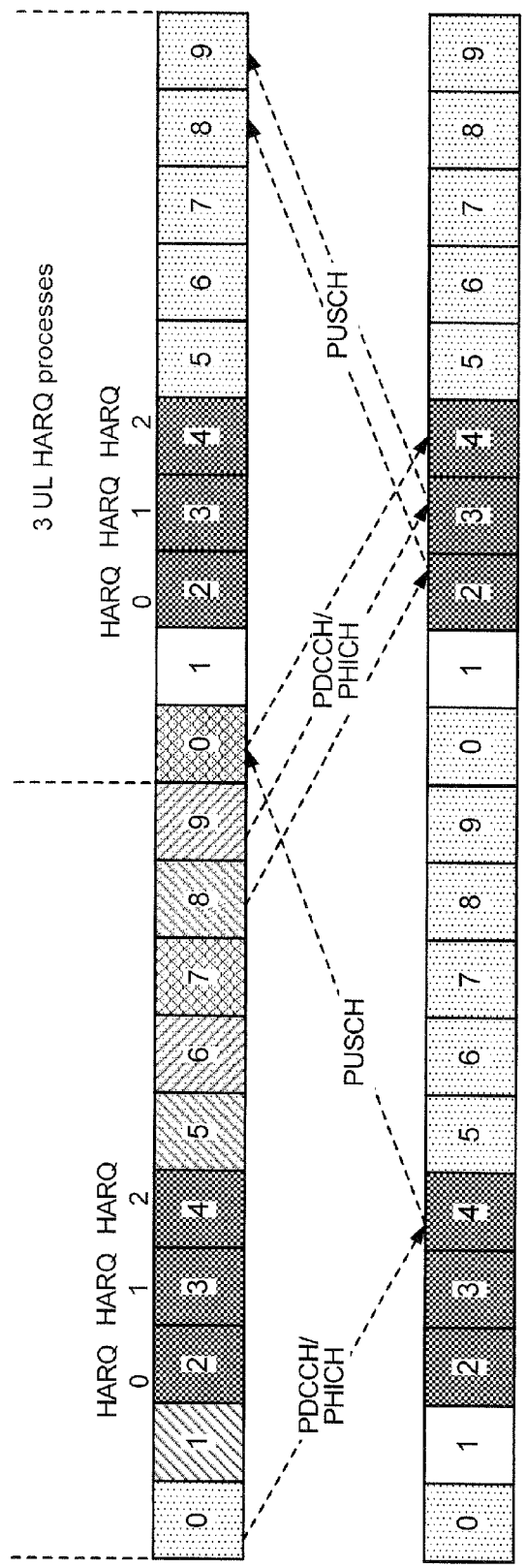

According to the embodiment illustrated in FIG. 10A, wherein the radio frame comprises three UL subframes, up to three power classes may be supported with 10 ms periodicity (i.e., conditioned on all power classes having a PUSCH transmission). For some embodiments, the three power classes may be supported by the following three groups: group 1: {1, 5, 8, 2}, group 2: {6, 9, 3}, and group 3: {7, 0, 4}, as illustrated in FIG. 10D. Each group may comprise at least an UL subframe and the DL subframe from which the UL subframe receives a grant message (e.g. PDCCH/PHICH), as illustrated in FIG. 10C. For some embodiments, the remaining DL subframes that have not yet been grouped (i.e., floating DL subframes) may be assigned to a group by grouping the floating DL subframes that is latest in time to any particular UL subframe. For example, DL subframes 1 and 5 may be assigned to group 1, DL subframe 6 may be assigned to group 2, and DL subframe 7 may be assigned to group 3. However, the floating DL subframes may be assigned to a group by another method.

Figure 11A:
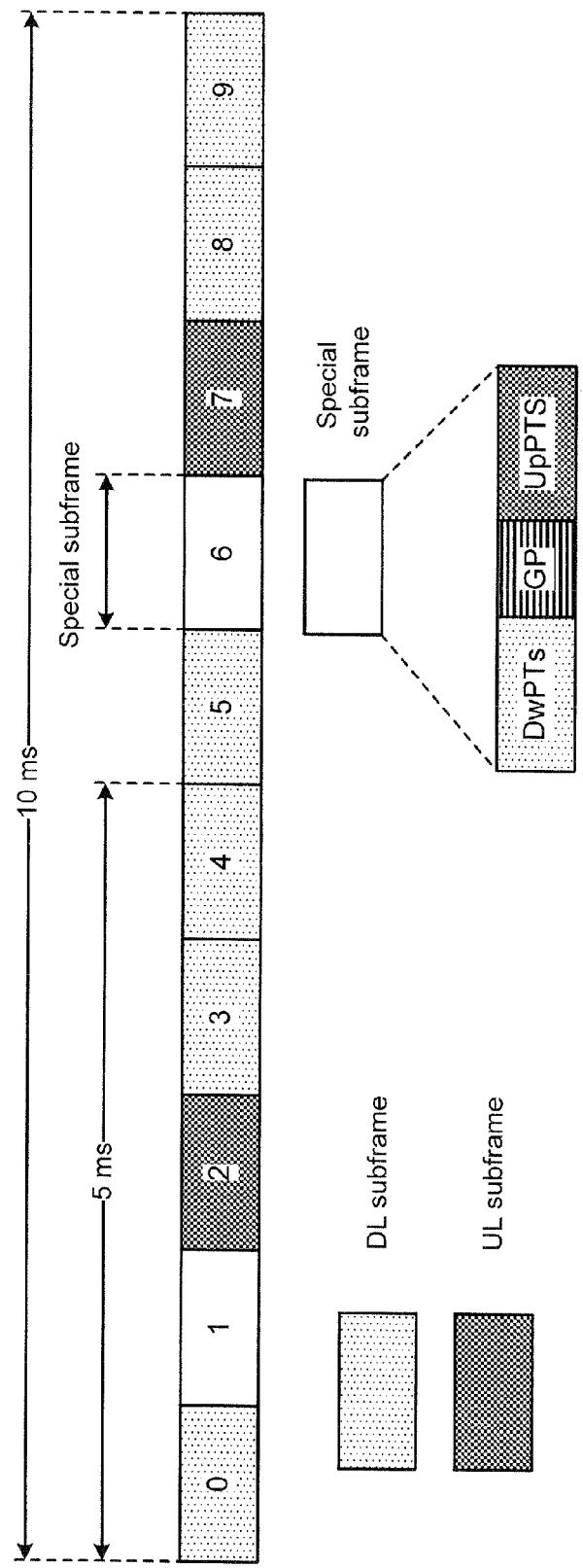
FIGS. 11A-D illustrate the partitioning of a radio frame comprising six DL subframes, two UL subframes, and two special subframes, in accordance with certain aspects of the present disclosure.
Figure 11B:
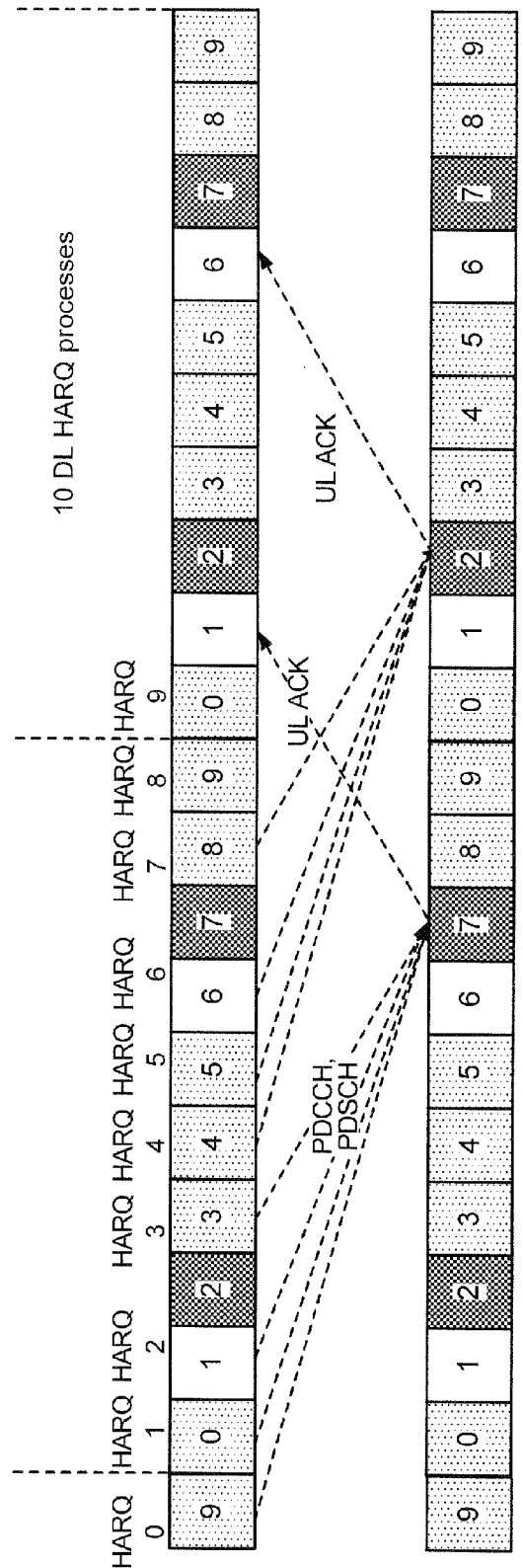
Figure 11C:
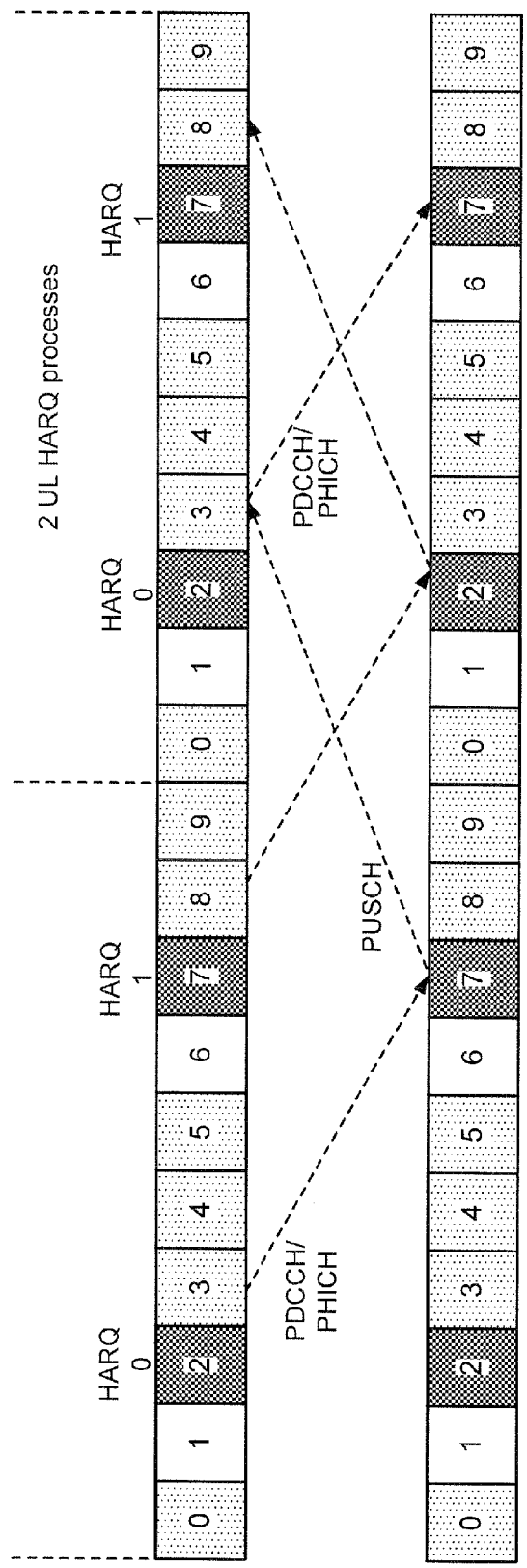

FIGS. 11A-D illustrate the partitioning of a radio frame comprising six DL subframes (e.g., subframes 0, 3-5, and 8-9), two UL subframes (e.g., subframes 2 and 7), and two special subframes (e.g., subframes 1 and 6), in accordance with certain aspects of the present disclosure. FIG. 11B illustrates DL HARQ processes between one or more eNBs and a UE, utilizing the radio frame illustrated in FIG. 11A, in accordance with certain aspects of the present disclosure. For some embodiments, 3 ms processing time may be honored, as described above. UL subframes 2 and 7 may each ACK four DL subframes. FIG. 11C illustrates UL HARQ processes between the one or more eNBs and the UE, utilizing the radio frame illustrated in FIG. 11A, in accordance with certain aspects of the present disclosure.

Figure 11D:
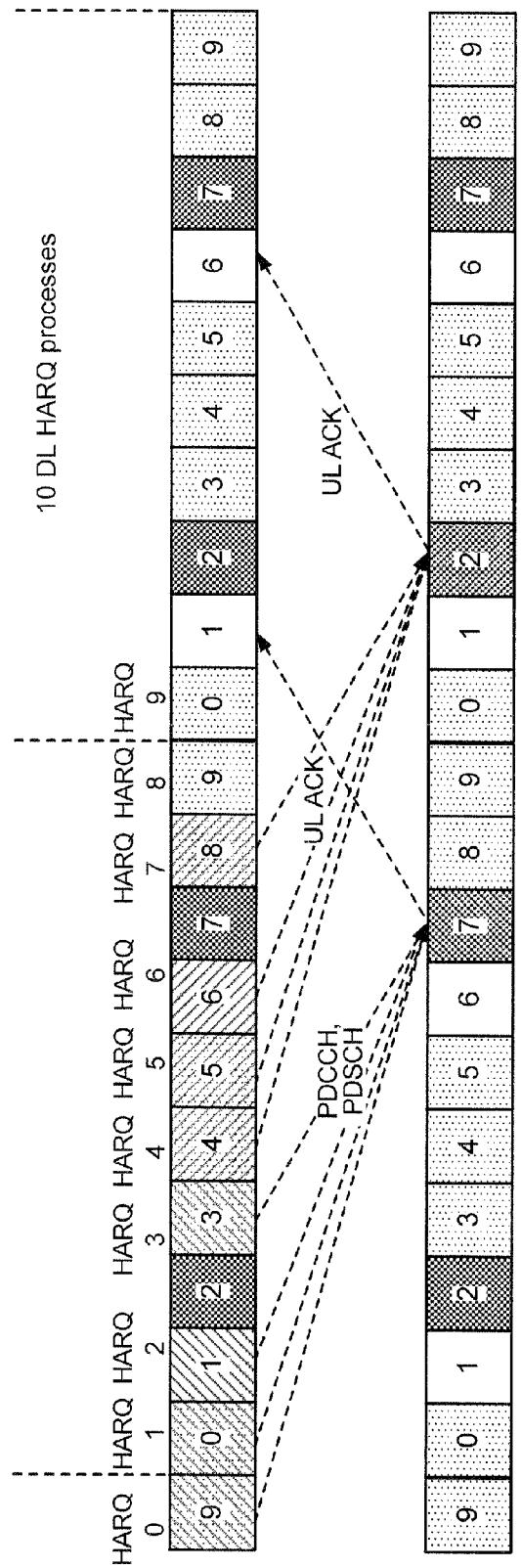

According to the embodiment illustrated in FIG. 11A, wherein the radio frame comprises two UL subframes, up to two power classes may be supported with 10 ms periodicity (i.e., conditioned on all power classes having a PUSCH transmission). For some embodiments, the two power classes may be supported by the following two groups: group 1: {9, 0, 1, 3, 7} and group 2: {4, 5, 6, 8, 2}, as illustrated in FIG. 11D. Each group may comprise at least an UL subframe and the DL subframe from which the UL subframe receives a grant message (i.e., PDCCH/PHICH), as illustrated in FIG. 11C. For some embodiments, the remaining DL subframes that have not yet been grouped (i.e., floating DL subframes) may be assigned to a group, as described above. TDM partitioning in UL may be available for the embodiment illustrated in FIG. 11D because UL subframes may have the same DL subframes to ACK and to get a PHICH/PDCCH assignment from.

Figure 12A:
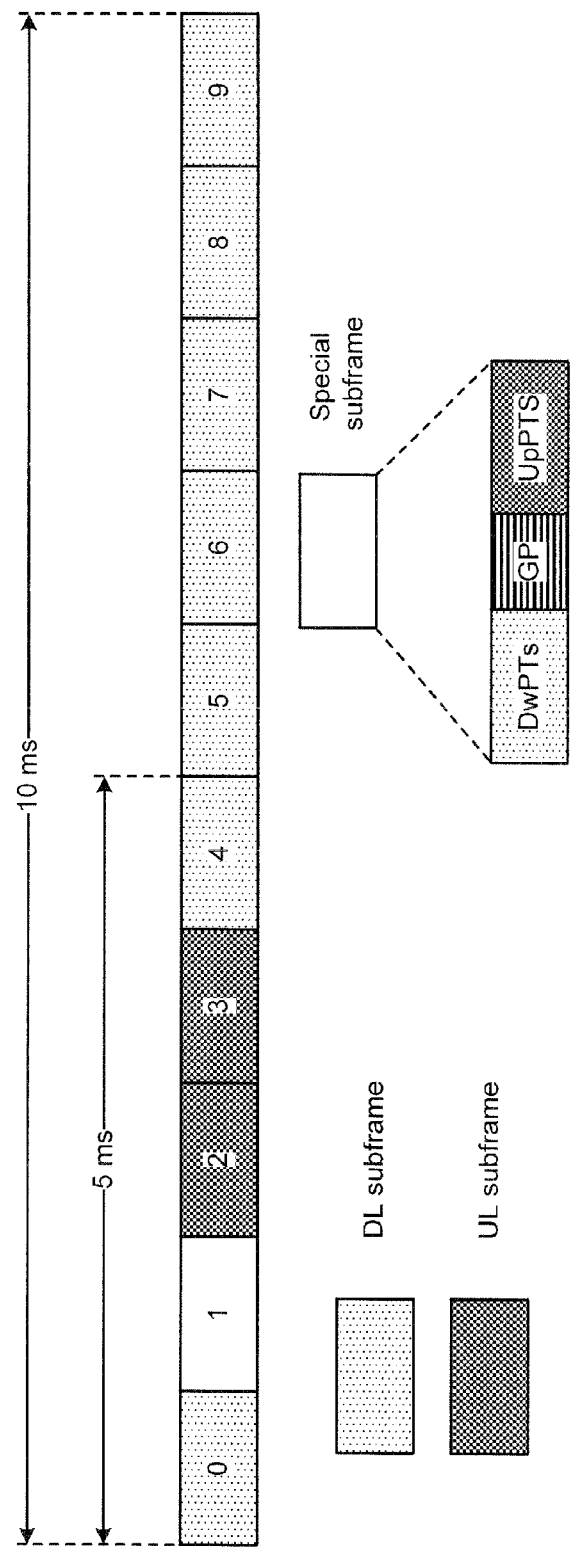
FIGS. 12A-D illustrate the partitioning of a radio frame comprising seven DL subframes, two UL subframes, and one special subframe, in accordance with certain aspects of the present disclosure.
Figure 12B:
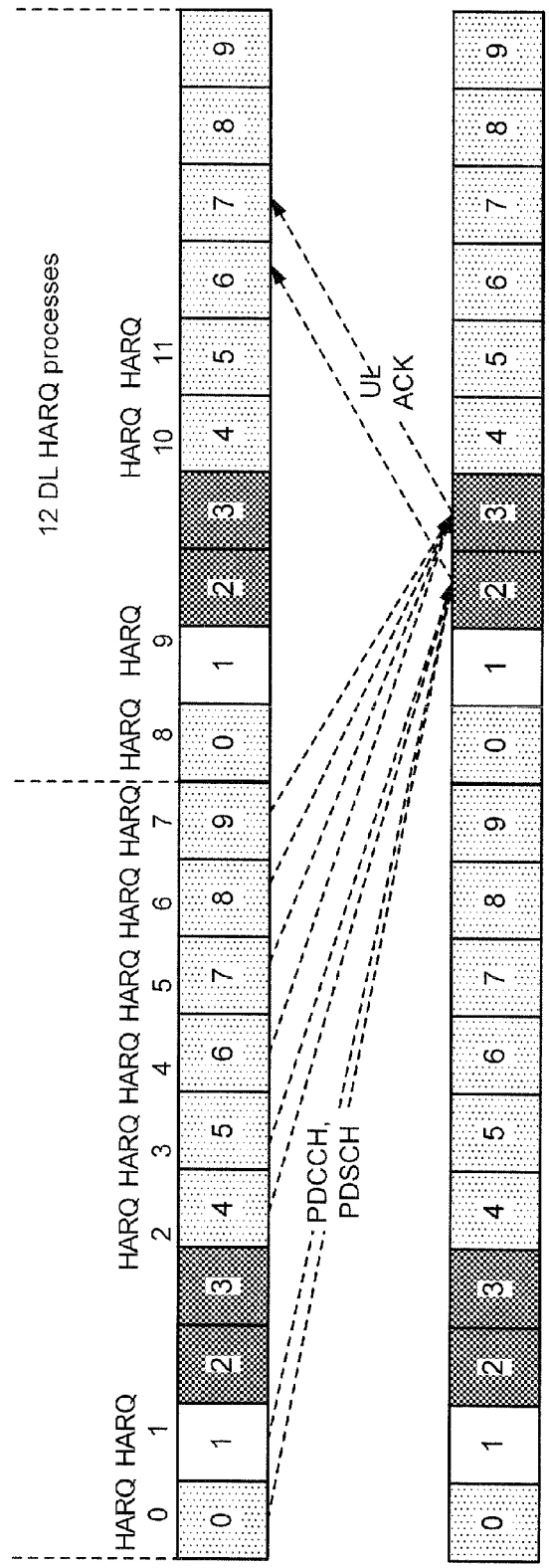
Figure 12C:
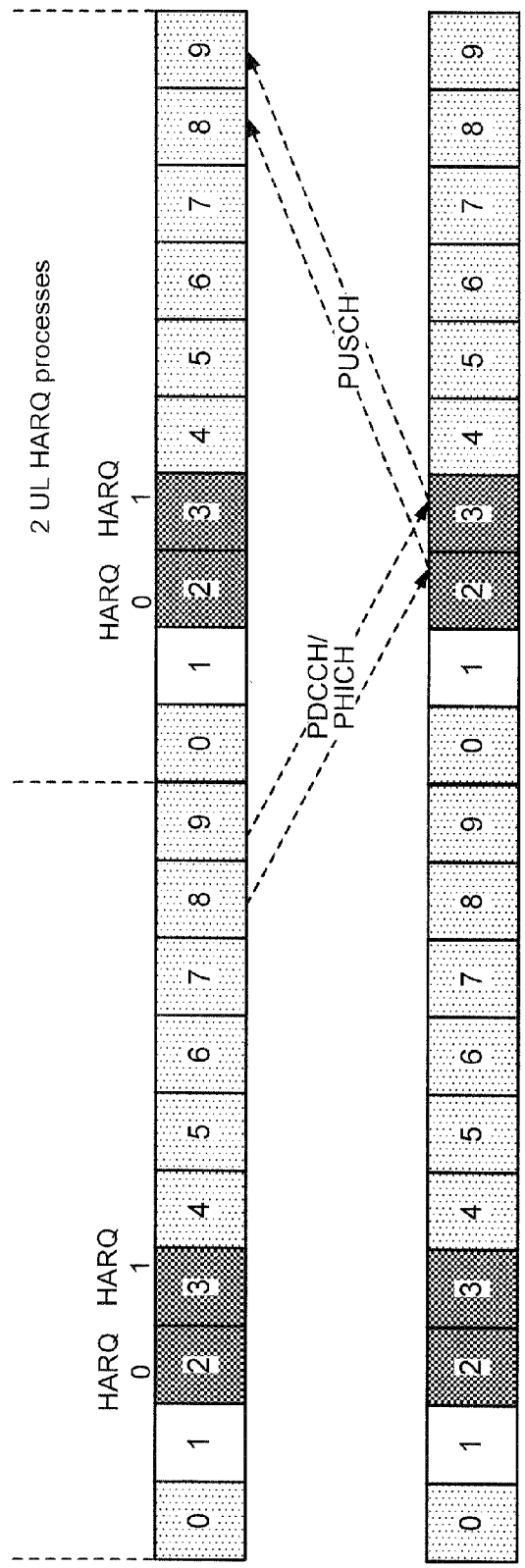

FIGS. 12A-D illustrate the partitioning of a radio frame comprising seven DL subframes (e.g., subframes 0 and 4-9), two UL subframes (e.g., subframes 2-3), and one special subframe (e.g., subframe 1), in accordance with certain aspects of the present disclosure. FIG. 12B illustrates DL HARQ processes between one or more eNBs and a UE utilizing the radio frame illustrated in FIG. 12A, in accordance with certain aspects of the present disclosure. For some embodiments, 3 ms processing time may be honored, as described above. UL subframes 2 and 3 may each ACK four DL subframes, as illustrated in FIG. 12B. FIG. 12C illustrates UL HARQ processes between the one or more eNBs and the UE, utilizing the radio frame illustrated in FIG. 12A, in accordance with certain aspects of the present disclosure.

Referring to FIGS. 12B-C, since UL subframes have different corresponding DL subframes to ACK and receive PHICH/PDCCH assignments, TDM partitioning may not be available in UL. For example, UL subframe 3 may ACK a message from DL subframe 8, as illustrated in FIG. 12B. However, referring to FIG. 12C, DL subframe 8 may acknowledge UL transmissions in UL subframe 2. Therefore, allowing TDM partitioning in UL may not allow for the partitioning of the subframes into multiple groups. As a result, UL may rather be protected by FDM partitioning, with eNB coordination. In other words, an UL subframe in a first group may ACK a DL subframe in a second group. In addition, more groups may be formed with a longer partition period, with UL HARQ suspension, as described above.

Figure 12D:
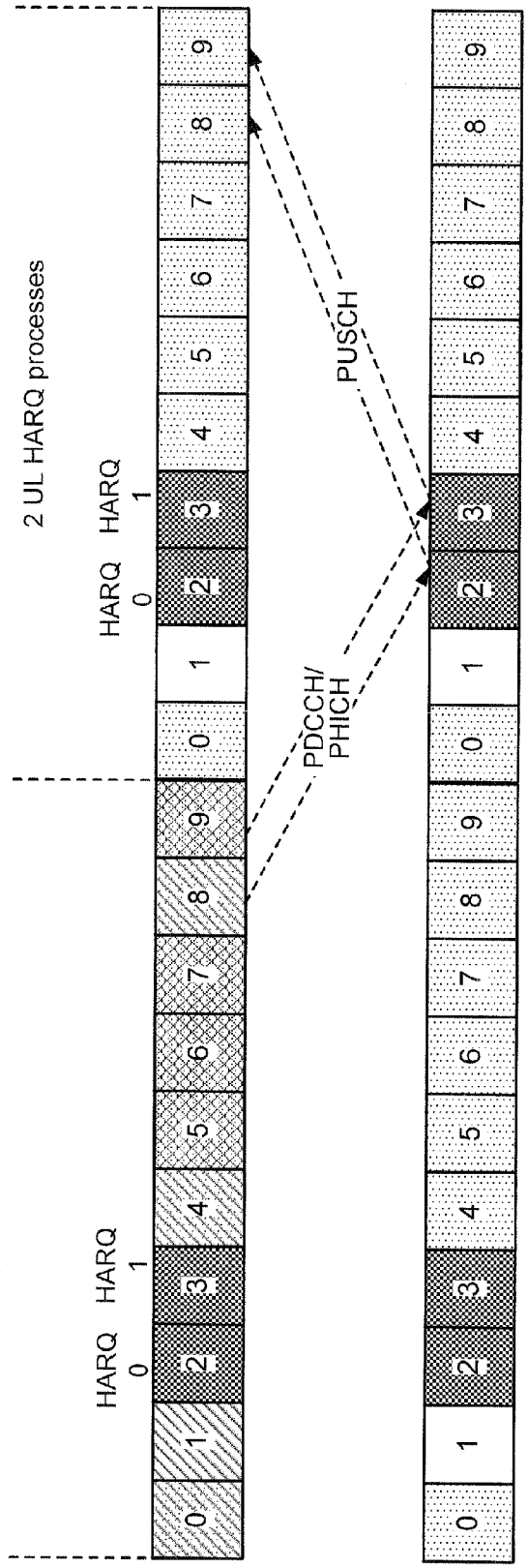

According to the embodiment illustrated in FIG. 12A, wherein the radio frame comprises two UL subframes, up to two power classes may be supported with 10 ms periodicity (i.e., conditioned on all power classes having a PUSCH transmission). For some embodiments, the two power classes may be supported by the following two groups: group 1: {0, 1, 4, 8, 2} and group 2: {5, 6, 7, 9, 3}, as illustrated in FIG. 12D. Each group may comprise at least an UL subframe and the DL subframe from which the UL subframe receives a grant message (i.e., PDCCH/PHICH), as illustrated in FIG. 12C. For some embodiments, the remaining DL subframes that have not yet been grouped (i.e., floating DL subframes) may be assigned to a group, as described above.

Figure 13A:
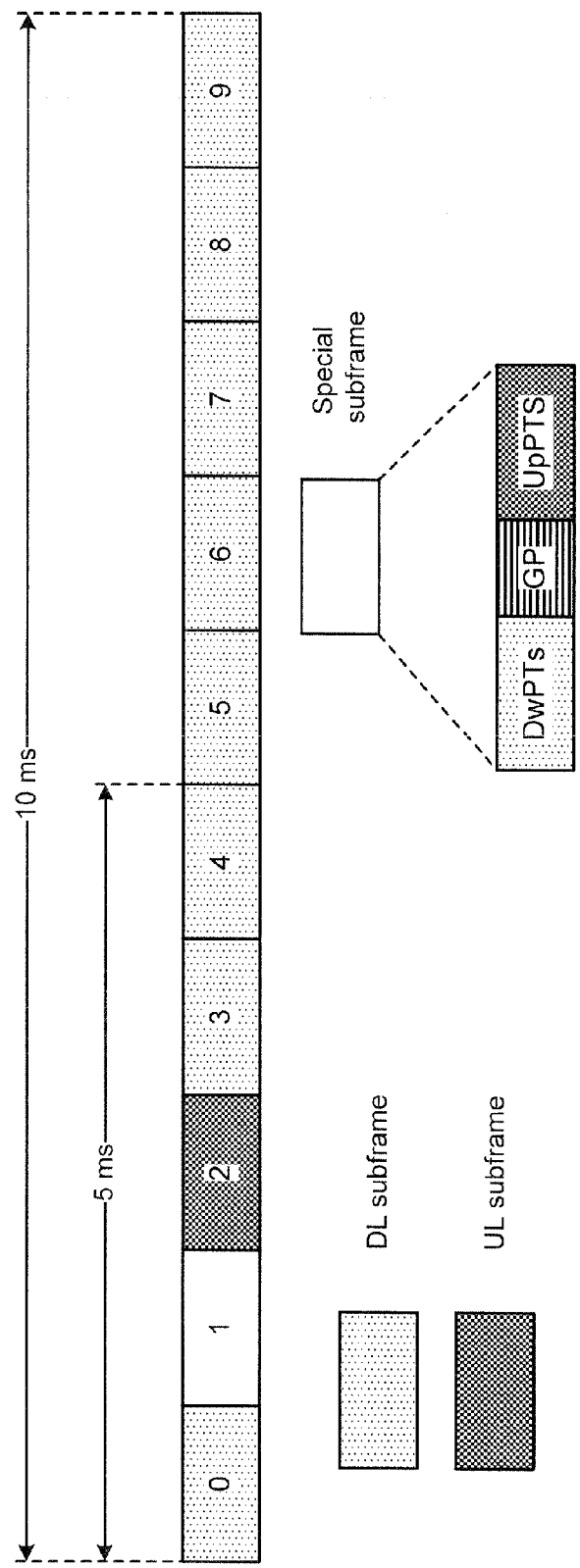
FIGS. 13A-C illustrate the partitioning of a radio frame comprising eight DL subframes, one UL subframe, and one special subframe, in accordance with certain aspects of the present disclosure.
Figure 13B:
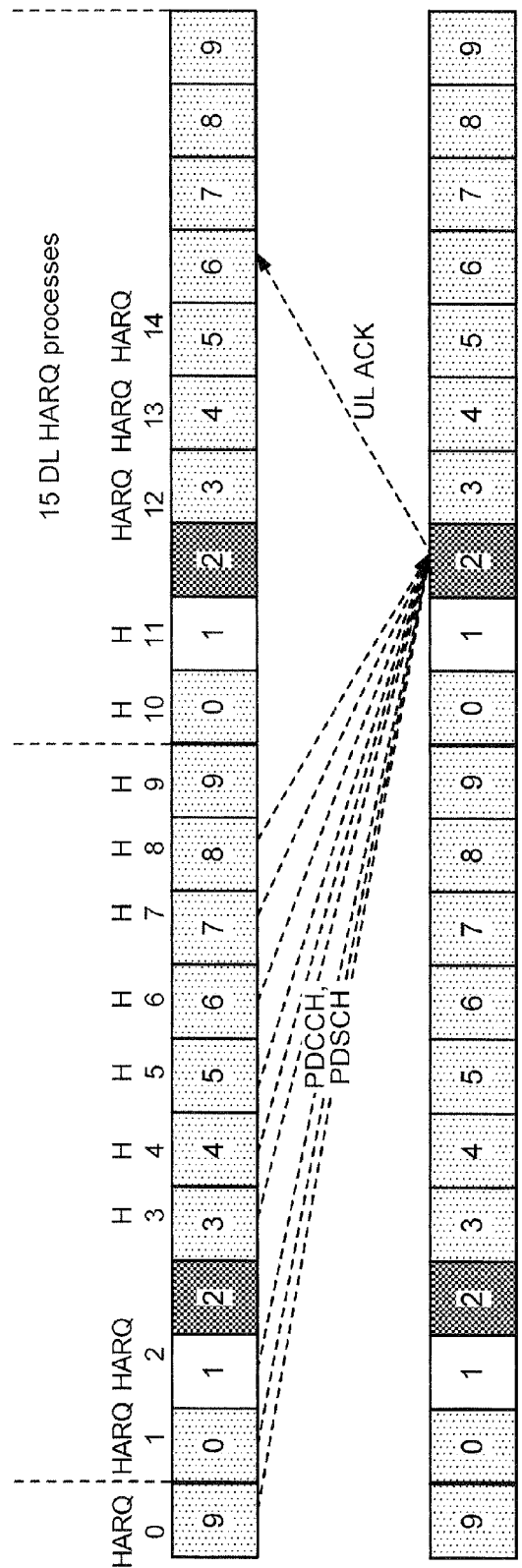
Figure 13C:
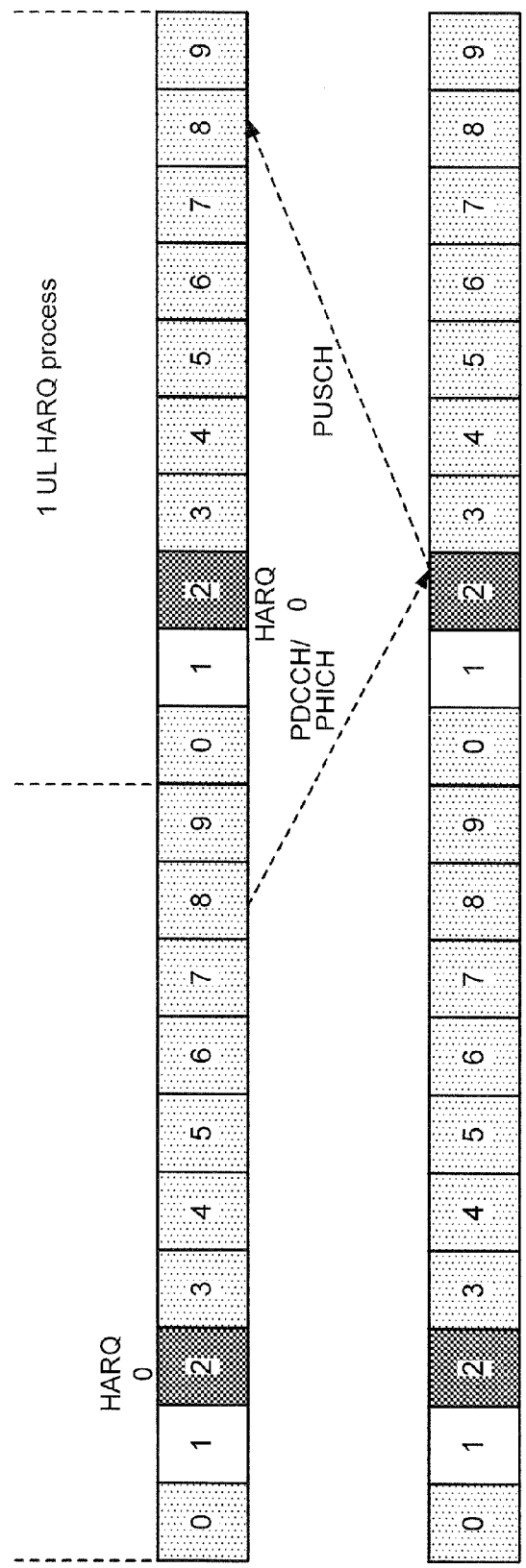

FIGS. 13A-C illustrate the partitioning of a radio frame comprising eight DL subframes (e.g., subframes 0 and 3-9), one UL subframe (e.g., subframe 2), and one special subframe (e.g., subframe 1), in accordance with certain aspects of the present disclosure. FIG. 13B illustrates DL HARQ processes between one or more eNBs and a UE, utilizing the radio frame illustrated in FIG. 13A, in accordance with certain aspects of the present disclosure. For some embodiments, 3 ms processing time may be honored, as described above. UL subframe 2 may ACK nine DL subframes, as illustrated in FIG. 13B. FIG. 13C illustrates UL HARQ processes between the one or more eNBs and the UE, utilizing the radio frame illustrated in FIG. 13A, in accordance with certain aspects of the present disclosure.

According to the embodiment illustrated in FIG. 13A, wherein the radio frame comprises one UL subframe, only one group may be formed with 10 ms periodicity (i.e., conditioned on each group having a PUSCH transmission). However, more groups may be formed by extending the TDM partition period, as described above.

Figure 14A:
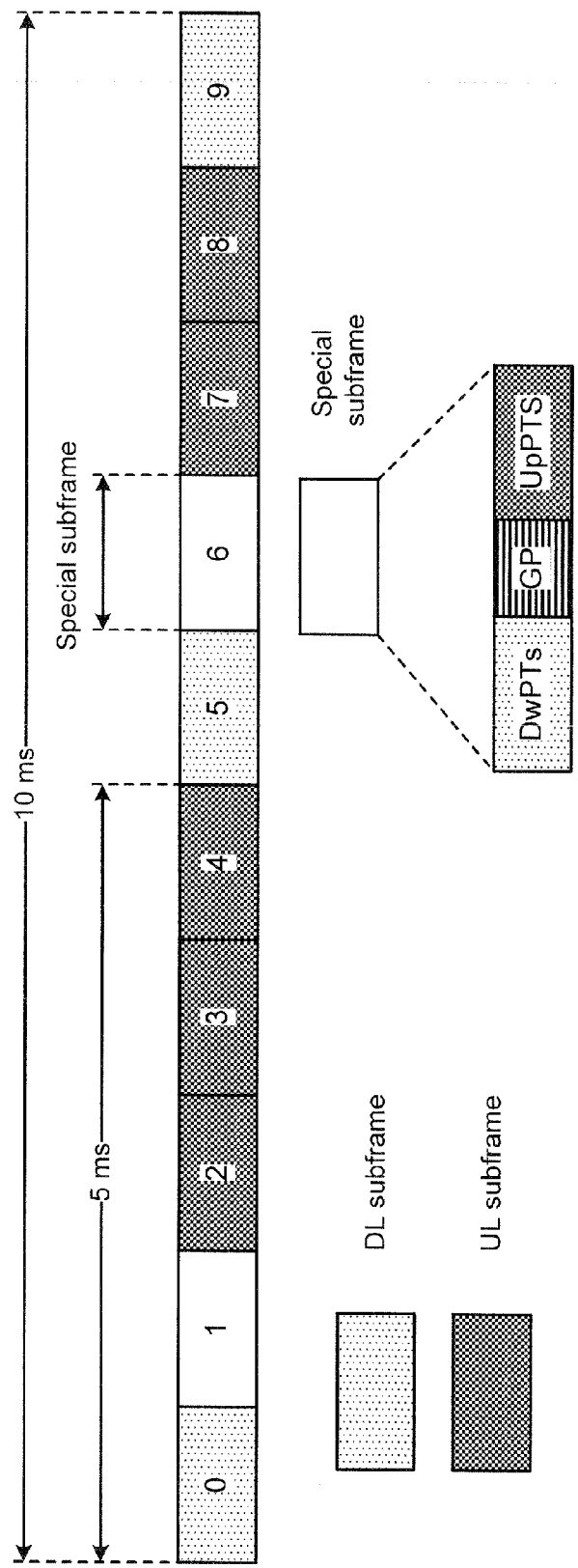
FIGS. 14A-D illustrate the partitioning of a radio frame comprising three DL subframes, five UL subframes, and two special subframes, in accordance with certain aspects of the present disclosure.
Figure 14B:
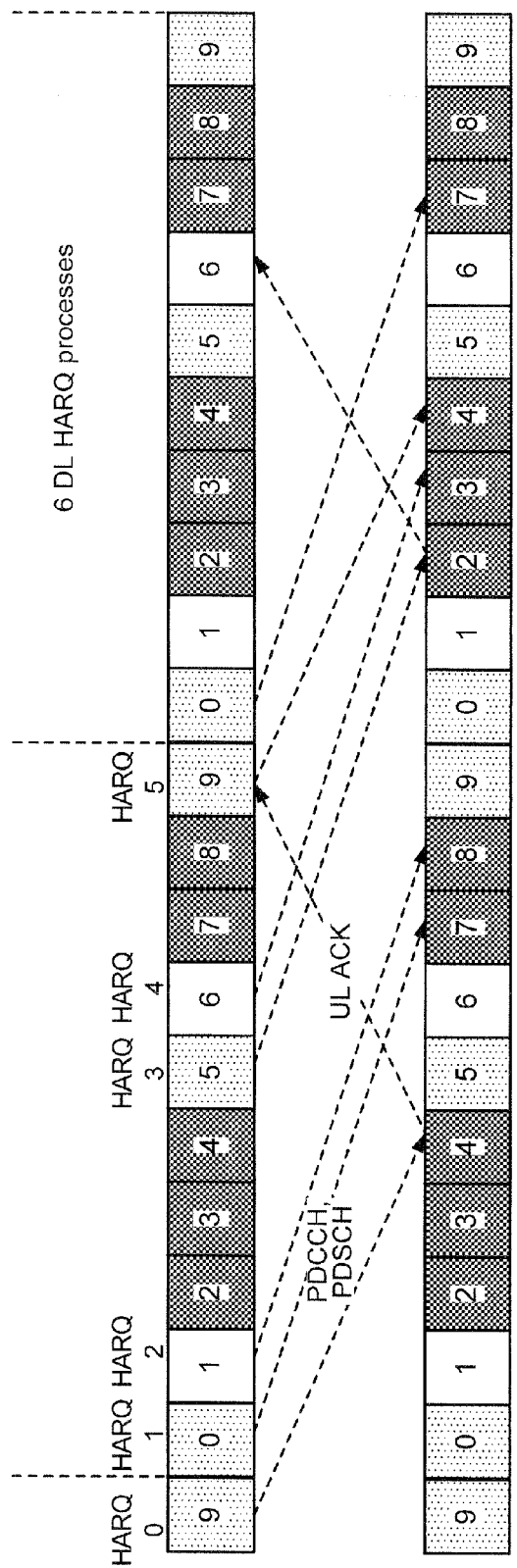
Figure 14C:
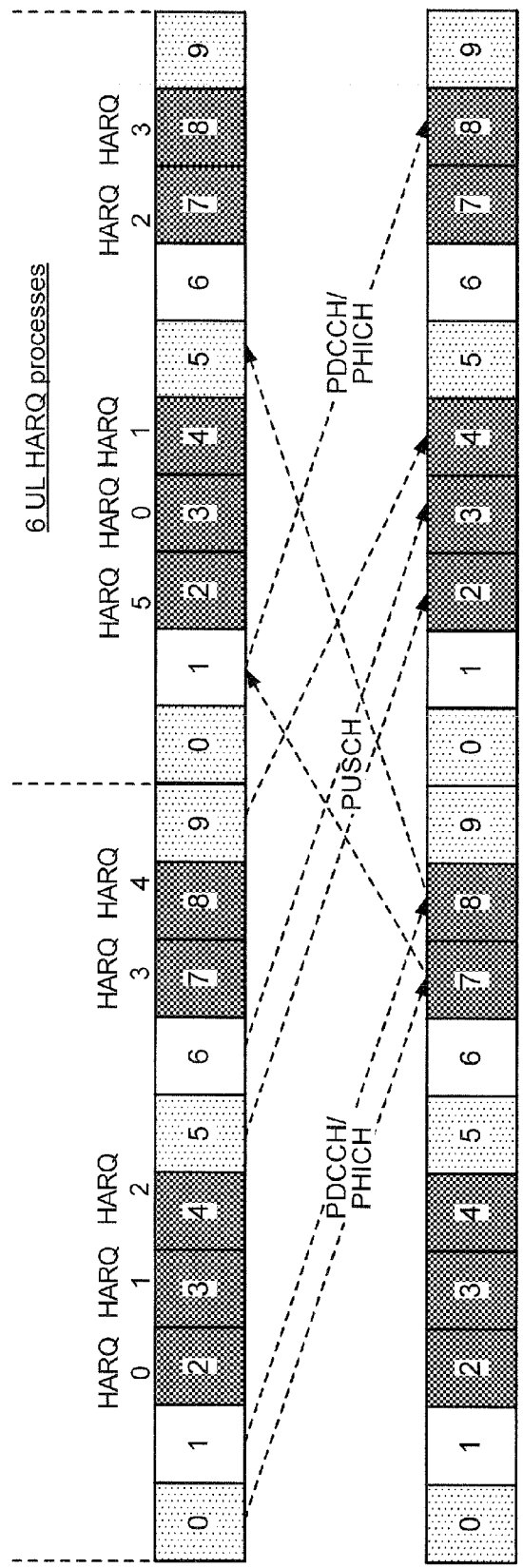
Figure 14D:
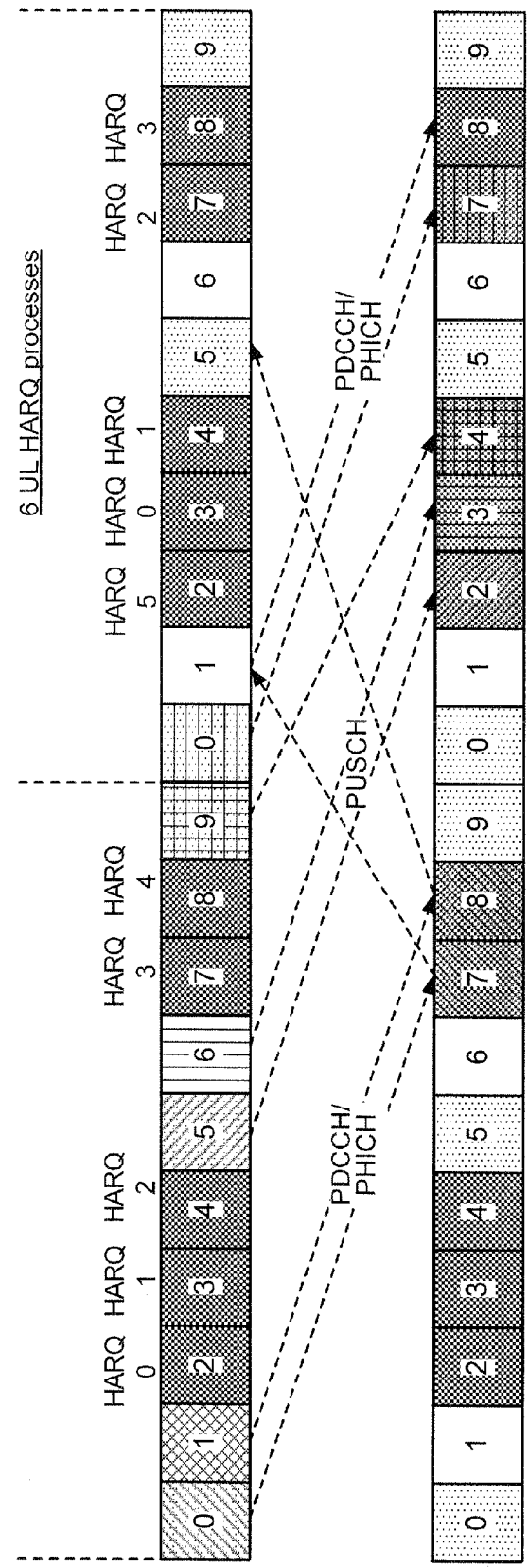

FIGS. 14A-D illustrate the partitioning of a radio frame comprising three DL subframes (e.g., subframes 0, 5, and 9), five UL subframes (e.g., subframes 2-4 and 7-8), and two special subframes (e.g., subframes 1 and 6), in accordance with certain aspects of the present disclosure. FIG. 14B illustrates DL HARQ processes between one or more eNBs and a UE, utilizing the radio frame illustrated in FIG. 14A, in accordance with certain aspects of the present disclosure. For some embodiments, 3 ms processing time may be honored, as described above. FIG. 14C illustrates UL HARQ processes between the one or more eNBs and the UE, utilizing the radio frame illustrated in FIG. 14A, in accordance with certain aspects of the present disclosure. Up to six groups may be formed with each associated DL/UL HARQ process, as illustrated in FIG. 14D. For example, a group may be formed by associating DL HARQ process 1 (from FIG. 14B) with UL HARQ process 4 (from FIG. 14C)

Figure 15A:
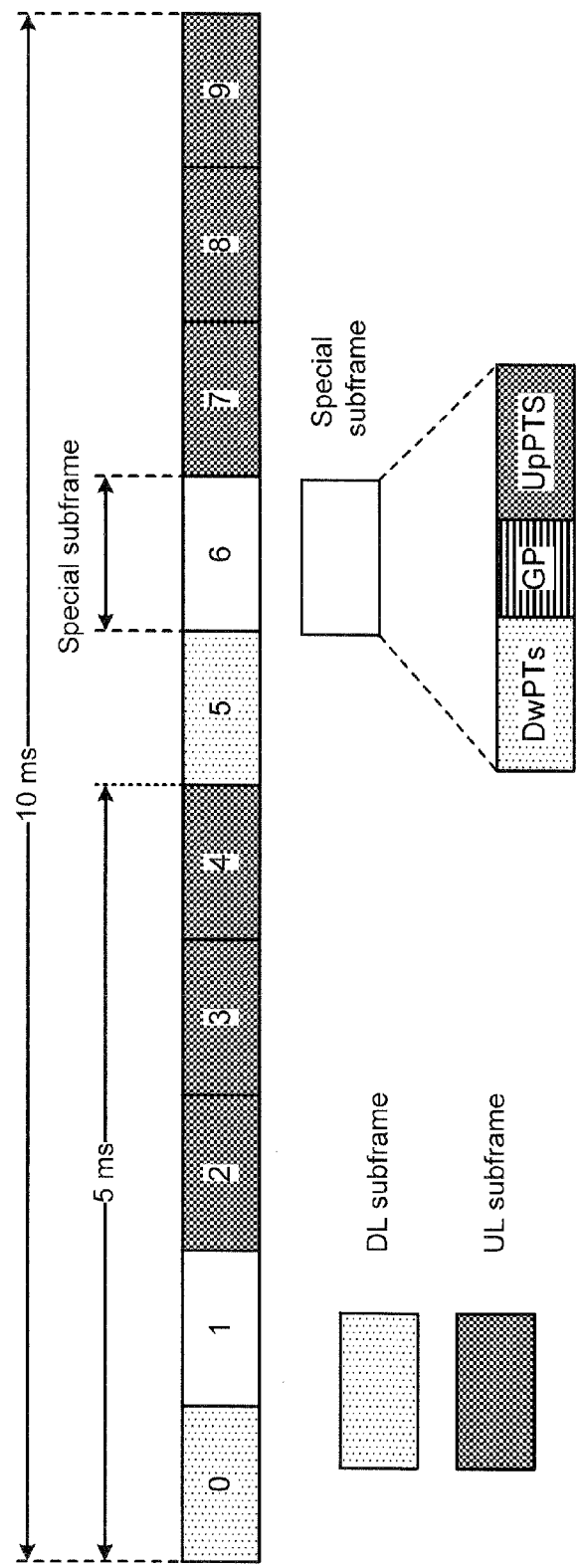
FIGS. 15A-D illustrate the partitioning of a radio frame comprising two DL subframes, six UL subframes, and two special subframes, in accordance with certain aspects of the present disclosure.
Figure 15B:
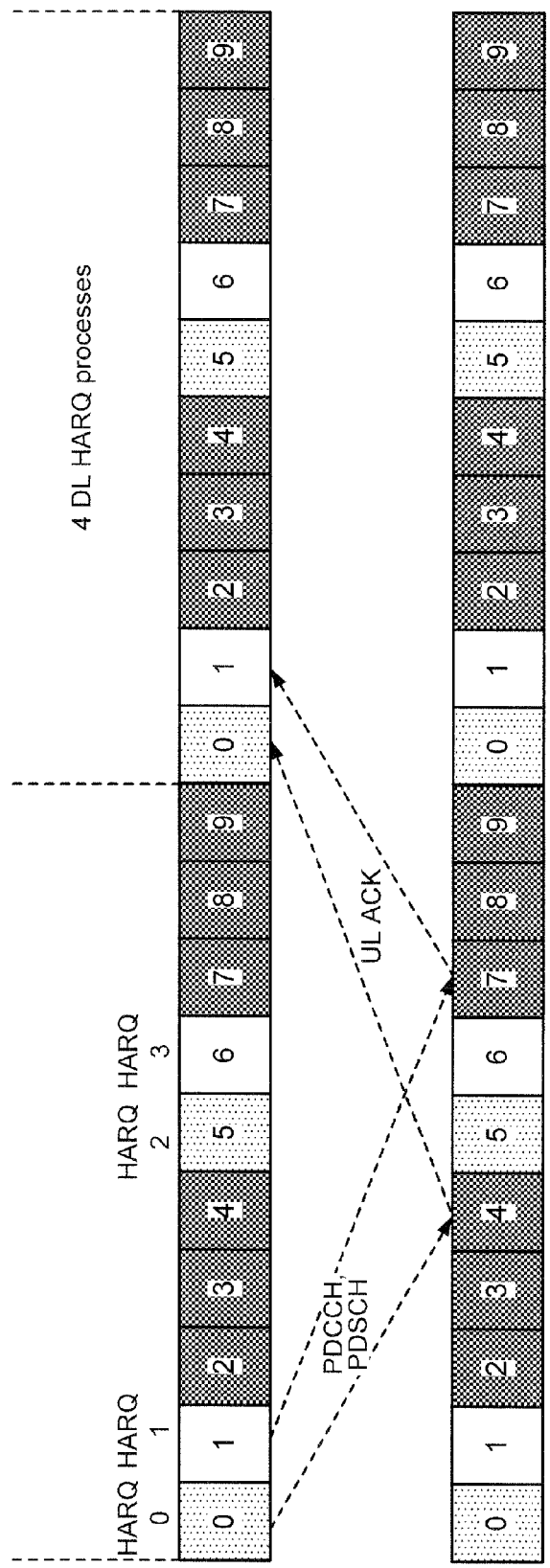
Figure 15C:
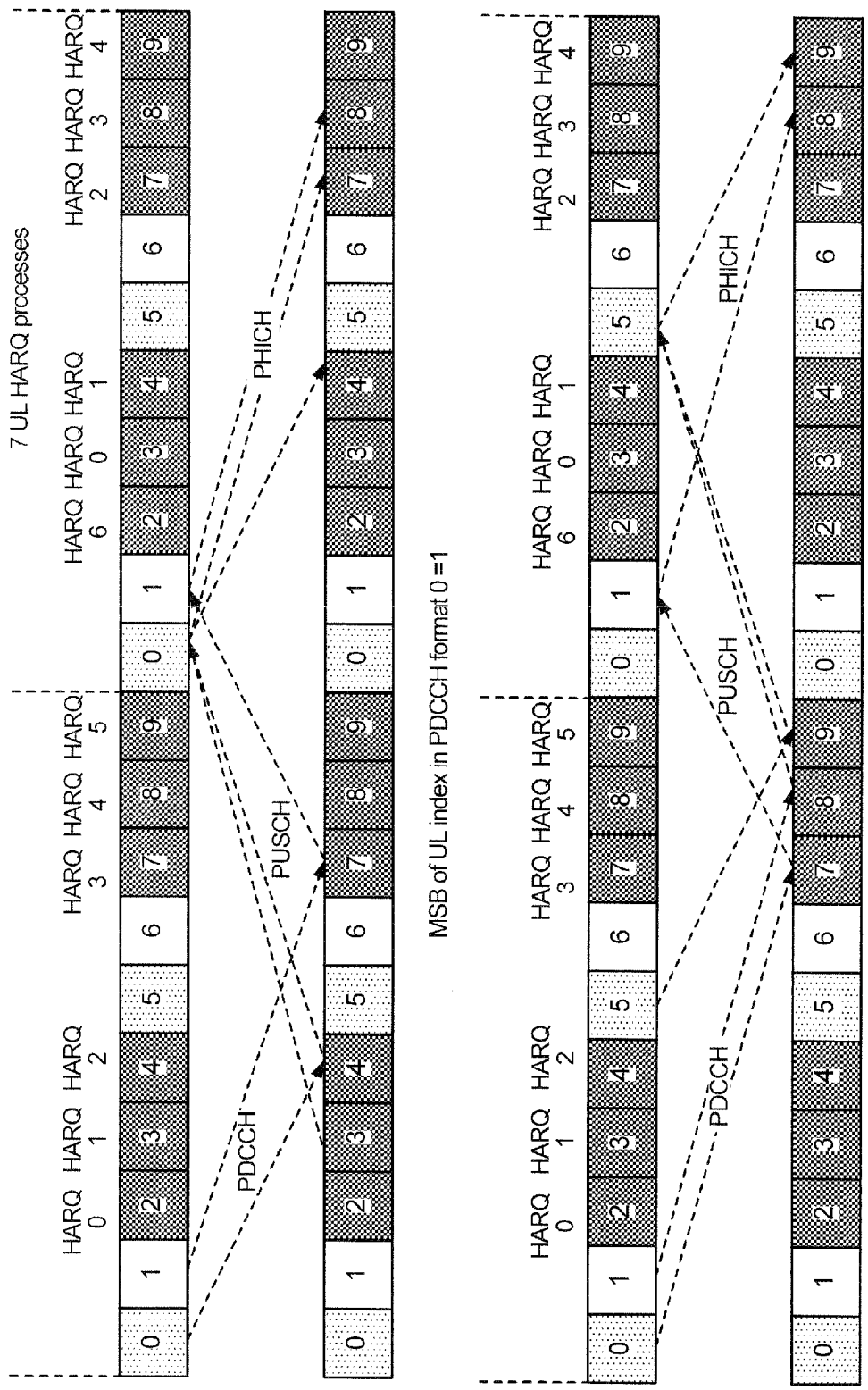

FIGS. 15A-D illustrate the partitioning of a radio frame comprising two DL subframes (e.g., subframes 0 and 5), six UL subframes (e.g., subframes 2-4 and 7-9), and two special subframes (e.g., subframes 1 and 6), in accordance with certain aspects of the present disclosure. FIG. 15B illustrates DL HARQ processes between one or more eNBs and a UE, utilizing the radio frame illustrated in FIG. 15A, in accordance with certain aspects of the present disclosure. For some embodiments, 3 ms processing time may be honored, as described above. As illustrated in FIG. 15A, there may be fewer DL subframes than UL subframes. For some embodiments, each DL subframe or special subframe may be required to address up to two UL subframes. An indication allowing a DL subframe or special subframe to address up to two UL subframes may be signaled in UL index in DCI format 0. For example, if a most significant bit (MSB) is set to be 1, the DL subframe or special subframe may address the latest UL subframe with 3 ms processing timeline, as illustrated in FIG. 15C. In addition, if a least significant bit (LSB) is set to be 1, the DL subframe or special subframe may addresses the next UL subframe after 3 ms processing time, as illustrated in FIG. 15C. In other words, if PUSCH is sent on UL subframe 4 or 9, or if PHICH is sent on special subframe 1 or 6, PHICH may address next to the latest UL subframe after 3 ms processing time; otherwise, PHICH may address the latest UL subframe with 3 ms processing timeline.

Figure 15D:
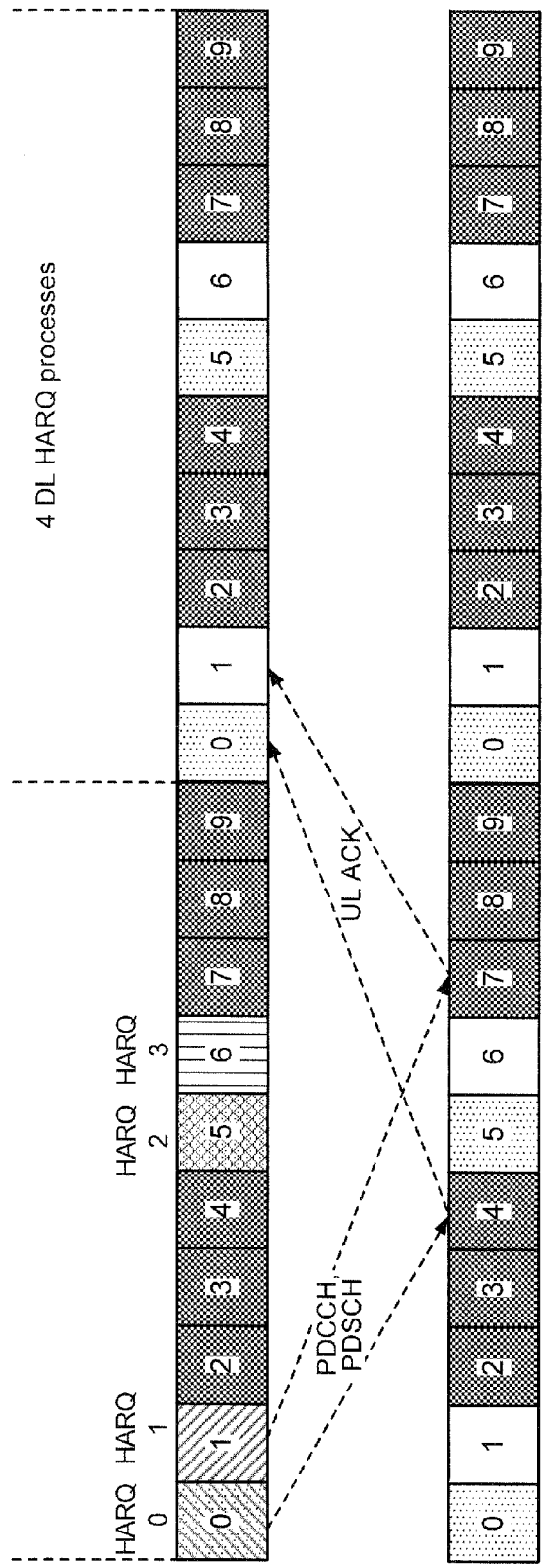

Four groups may be formed in DL, as illustrated in FIG. 15D, for example, group 1: {0, 4}; group 2: {1, 7, 8}; group 3: {5, 9}; and group 4: {6, 2, 3}. PDCCH may be relied on instead of PHICH to maintain the grouping. In other words, the grant message for the retransmission of uplink data may be transmitted on the same one or more UL subframes.

TDM partitioning may be used to protect DL subframes. However, no TDM partitioning may be available in the UL due to the synchronous HARQ operation in UL together with the fixed UL ACK timing for DL HARQ. However, UL subframes may be protected by FDM with eNB coordination.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:
1. A method for wireless communications, comprising:
  determining one or more groups of subframes, wherein each group comprises:
    one or more downlink subframes for downlink transmissions comprising at least a downlink grant, an uplink assignment, a downlink data transmission, and an acknowledgement of an uplink transmission; and
    one or more uplink subframes for an acknowledgement of a downlink transmission and an uplink data transmission; and
  scheduling transmissions using at least one of the groups of subframes, wherein a radio frame comprises a special subframe at subframes 1 and 6, and wherein determining the one or more groups of subframes comprises determining, at least one of:
two groups over the radio frame, wherein:
a first group comprises subframes 9, 0, 1, 3, and 7; and
a second group comprises subframes 4, 5, 6, 8, and 2;
four groups over the radio frame, wherein:
a first group comprises subframes 0, 1, and 7;
a second group comprises subframes 5, 6, and 2;
a third group comprises subframes 4 and 8; and
a fourth group comprises subframes 9 and 3; and
eight groups over two radio frames, wherein:
a first group comprises subframes 0, 1, and 7 of a first radio frame;
a second group comprises subframes 5, 6, and 2 of the first radio frame;
a third group comprises subframes 4 and 8 of the first radio frame;
a fourth group comprises subframes 9 and 3 of the first radio frame;
a fifth group comprises subframes 0, 1, and 7 of a second radio frame;
a sixth group comprises subframes 5, 6, and 2 of the second radio frame;
a seventh group comprises subframes 4 and 8 of the second radio frame; and
an eighth group comprises subframes 9 and 3 of the second radio frame.

2. The method of claim 1, wherein the one or more groups of subframes are determined based, at least in part, on resource partitioning information (RPI) that identifies subframes that are usable by a UE and protected due to cooperative partitioning of resources between a serving Node B and one or more non-serving Node Bs.

3. The method of claim 1, wherein the one or more downlink subframes are protected by Time Division Multiplexing (TDM) partitioning.

4. The method of claim 1, wherein determining the one or more groups of subframes further comprises grouping the one or more downlink subframes that are latest in time to the one or more uplink subframes.

5. The method of claim 1, wherein determining the one or more groups of subframes further comprises determining one or more groups with a periodicity greater than a length of a radio frame.

6. The method of claim 5, further comprising suspending uplink hybrid automatic retransmission request (HARQ) transmissions when uplink transmissions of a first group fall into a second group.

7. The method of claim 1, wherein determining the one or more groups of subframes further comprises determining one or more groups with a periodicity equal to a length of a radio frame.

8. The method of claim 1, wherein the one or more uplink subframes in a first group acknowledge a downlink subframe in a second group.

9. The method of claim 8, wherein the one or more uplink subframes are protected by Frequency Division Multiplexing (FDM) partitioning.

10. The method of claim 1, further comprising transmitting a grant message for retransmission of uplink data on the same one or more uplink subframes.

11. The method of claim 1, wherein the uplink and downlink subframes occupy overlapping frequency ranges.

12. The method of claim 1, wherein determining the one or more groups of subframes further comprises combining individual groups when a fewer number of groups are required.

13. A method for wireless communications, comprising:
determining one or more groups of subframes, wherein each group comprises:
one or more downlink subframes for downlink transmissions comprising at least a downlink grant, an uplink assignment, a downlink data transmission, and an acknowledgement of an uplink transmission; and
one or more uplink subframes for an acknowledgement of a downlink transmission and an uplink data transmission; and
scheduling transmissions using at least one of the groups of subframes,
wherein a radio frame comprises a special subframe at subframe 1, and wherein determining the one or more groups of subframes comprises determining, at least one of:
two groups over the radio frame, wherein:
a first group comprises subframes 0, 1, 4, 8, and 2; and
a second group comprises subframes 5, 6, 7, 9, and 3; and
three groups over the radio frame, wherein:
a first group comprises subframes 1, 5, 8, and 2;
a second group comprises subframes 6, 9, and 3; and
a third group comprises subframes 7, 0, and 4.

14. The method of claim 13, wherein determining the one or more groups of subframes further comprises combining individual groups when a fewer number of groups are required.

15. The method of claim 1, wherein a radio frames comprises an uplink subframe at subframe 2, and wherein determining the one or more groups of subframes comprises determining one group over the radio frame.

16. A method for wireless communications, comprising:
determining one or more groups of subframes, wherein each group comprises:
one or more downlink subframes for downlink transmissions comprising at least a downlink grant, an uplink assignment, a downlink data transmission, and an acknowledgement of an uplink transmission; and
one or more uplink subframes for an acknowledgement of a downlink transmission and an uplink data transmission; and
scheduling transmissions using at least one of the groups of subframes,
wherein a radio frame comprises a special subframe at subframes 1 and 6, and wherein determining the one or more groups of subframes comprises determining six groups over the radio frame, wherein the six groups are made with each associated downlink hybrid automatic retransmission request (HARQ) process and uplink HARQ process.

17. The method of claim 16, wherein determining the one or more groups of subframes further comprises combining individual groups when a fewer number of groups are required.

18. A method for wireless communications, comprising:
determining one or more groups of subframes wherein each group comprises:
one or more downlink subframes for downlink transmissions comprising at least a downlink grant, an uplink assignment, a downlink data transmission, and an acknowledgement of an uplink transmission; and one or more uplink subframes for an acknowledgement of a downlink transmission and an uplink data transmission; and scheduling transmissions using at least one of the groups of subframes, wherein a radio frame comprises less downlink subframes than uplink subframes, and wherein determining the one or more groups of subframes comprises determining four groups over the radio frame, wherein:
 a first group comprises subframes 0 and 4;
 a second group comprises subframes 1, 7, and 8;
 a third group comprises subframes 5 and 9; and
 a fourth group comprises subframes 6, 2, and 3.

19. The method of claim 18, wherein determining the one or more groups of subframes further comprises combining individual groups when a fewer number of groups are required.

20. An apparatus for wireless communications, comprising:
 means for determining one or more groups of subframes, wherein each group comprises:
  one or more downlink subframes for downlink transmissions comprising at least a downlink grant, an uplink assignment, a downlink data transmission, and an acknowledgement of an uplink transmission; and
  one or more uplink subframes for an acknowledgement of a downlink transmission and an uplink data transmission; and
 means for scheduling transmissions using at least one of the groups of subframes,
 wherein a radio frame comprises a special subframe at subframes 1 and 6, and wherein the means for determining the one or more groups of subframes comprises means for determining, at least one of:
  two groups over the radio frame, wherein:
   a first group comprises subframes 9, 0, 1, 3, and 7; and
   a second group comprises subframes 4, 5, 6, 8, and 2;
  four groups over the radio frame, wherein:
   a first group comprises subframes 0, 1, and 7;
   a second group comprises subframes 5, 6, and 2;
   a third group comprises subframes 4 and 8; and
   a fourth group comprises subframes 9 and 3; and
  eight groups over two radio frames, wherein:
   a first group comprises subframes 0, 1, and 7 of a first radio frame;
   a second group comprises subframes 5, 6, and 2 of the first radio frame;
   a third group comprises subframes 4 and 8 of the first radio frame;
   a fourth group comprises subframes 9 and 3 of the first radio frame;
   a fifth group comprises subframes 0, 1, and 7 of a second radio frame;
   a sixth group comprises subframes 5, 6, and 2 of the second radio frame;
   a seventh group comprises subframes 4 and 8 of the second radio frame; and
   an eighth group comprises subframes 9 and 3 of the second radio frame.

21. An apparatus for wireless communications, comprising:
 at least one processor configured to:
  determine one or more groups of subframes, wherein each group comprises:
   one or more downlink subframes for downlink transmissions comprising at least a downlink grant, an uplink assignment, a downlink data transmission, and an acknowledgement of an uplink transmission; and
   one or more uplink subframes for an acknowledgement of a downlink transmission and an uplink data transmission; and
  schedule transmissions using at least one of the groups of subframes,
  wherein a radio frame comprises a special subframe at subframes 1 and 6, and wherein the at least one processor is further configured to determine, at least one of:
   two groups over the radio frame, wherein:
    a first group comprises subframes 9, 0, 1, 3, and 7; and
    a second group comprises subframes 4, 5, 6, 8, and 2;
   four groups over the radio frame, wherein:
    a first group comprises subframes 0, 1, and 7;
    a second group comprises subframes 5, 6, and 2;
    a third group comprises subframes 4 and 8; and
    a fourth group comprises subframes 9 and 3; and
   eight groups over two radio frames, wherein:
    a first group comprises subframes 0, 1, and 7 of a first radio frame;
    a second group comprises subframes 5, 6, and 2 of the first radio frame;
    a third group comprises subframes 4 and 8 of the first radio frame;
    a fourth group comprises subframes 9 and 3 of the first radio frame;
    a fifth group comprises subframes 0, 1, and 7 of a second radio frame;
    a sixth group comprises subframes 5, 6, and 2 of the second radio frame;
    a seventh group comprises subframes 4 and 8 of the second radio frame; and
    an eighth group comprises subframes 9 and 3 of the second radio frame.

22. The apparatus of claim 21, wherein the one or more groups of subframes are determined based, at least in part, on resource partitioning information (RPI) that identifies subframes that are usable by a UE and protected due to cooperative partitioning of resources between a serving Node B and one or more non-serving Node Bs.

23. The apparatus of claim 21, wherein the one or more downlink subframes are protected by Time Division Multiplexing (TDM) partitioning.

24. The apparatus of claim 21, wherein the at least one processor is further configured to group the one or more downlink subframes that are latest in time to the one or more uplink subframes.

25. The apparatus of claim 21, wherein the one or more uplink subframes in a first group acknowledge a downlink subframe in a second group.

26. The apparatus of claim 25, wherein the one or more uplink subframes are protected by Frequency Division Multiplexing (FDM) partitioning.

27. The apparatus of claim 21, wherein the at least one processor is configured to transmit a grant message for retransmission of uplink data on the same one or more uplink subframes.

28. The apparatus of claim 21, wherein the uplink and downlink subframes occupy overlapping frequency ranges.

29. A computer-program product stored on a non-transitory computer-readable medium comprising code that when executed on at least one computer performs the steps of:

determining one or more groups of subframes, wherein each group comprises:
  one or more downlink subframes for downlink transmissions comprising at least a downlink grant, an uplink assignment, a downlink data transmission, and an acknowledgement of an uplink transmission; and
  one or more uplink subfrarnes for an acknowledgement of a downlink transmission and an uplink data transmission; and
scheduling transmissions using at least one of the groups of subframes,
wherein a radio frame comprises a special subframe at subframes 1 and 6, and wherein the determining the one or more groups of subfrarnes comprises determining, at least one of:
  two groups over the radio frame, wherein:
    a first group comprises subframes 9, 0, 1, 3, and 7; and
    a second group comprises subframes 4, 5, 6, 8, and 2;
  four groups over the radio frame wherein:
    a first group comprises subframes 0, 1, and 7;
    a second group comprises subframes 5, 6, and 2;
    a third group comprises subframes 4 and 8; and
    a fourth group comprises subframes 9 and 3; and
  eight groups over two radio frames, wherein:
    a first group comprises subframes 0, 1, and 7 of a first radio frame;
    a second group comprises subframes 5, 6, and 2 of the first radio frame;
    a third group comprises subframes 4 and 8 of the first radio frame;
    a fourth group comprises subframes 9 and 3 of the first radio frame;
    a fifth group comprises subframes 0, 1, and 7 of a second radio frame;
    a sixth group comprises subframes 5, 6, and 2 of the second radio frame;
    a seventh group comprises subframes 4 and 8 of the second radio frame; and
    an eighth group comprises subframes 9 and 3 of the second radio frame.

30. A method for wireless communications, comprising:
receiving a grant message in a downlink subframe; and
based on the downlink subframe, determining a group of subframes from multiple groups of subframes, wherein each group from the multiple groups comprises:
  one or more downlink subframes for downlink transmissions comprising at least a downlink grant, an uplink grant, a downlink data transmission, and an acknowledgement of an uplink transmission; and
  one or more uplink subframes for an acknowledgement of a downlink transmission and an uplink data transmission,
wherein a radio frame comprises a special subframe at subframes 1 and 6, and wherein determining the group of subframes from the multiple groups of subframes comprises determining, at least one of:
  two groups over the radio frame, wherein:
    a first group comprises subframes 9, 0, 1, 3, and 7; and
    a second group comprises subframes 4, 5, 6, 8, and 2;
  four groups over the radio frame, wherein:
    a first roup comprises subframes 0, 1, and 7;
    a second group comprises subframes 5, 6, and 2;
    a third group comprises subframes 4 and 8; and
    a fourth group comprises subframes 9 and 3; and
  eight groups over two radio frames, wherein:
    a first group comprises subframes 0, 1, and 7 of a first radio frame;
    a second group comprises subframes 5, 6, and 2 of the first radio frame;
    a third group comprises subframes 4 and 8 of the first radio frame;
    a fourth group comprises subframes 9 and 3 of the first radio frame;
    a fifth group comprises subframes 0, 1, and 7 of a second radio frame;
    a sixth group comprises subframes 5, 6, and 2 of the second radio frame;
    a seventh group comprises subframes 4 and 8 of the second radio frame; and
    an eighth group comprises subframes 9 and 3 of the second radio frame.

31. The method of claim 30, wherein the one or more groups of subframes are determined based, at least in part, on resource partitioning information (RPI) that identifies subframes that are usable and protected due to cooperative partitioning of resources between a serving Node B and one or more non-serving Node Bs.

32. The method of claim 30, wherein the one or more downlink subframes are protected by Time Division Multiplexing (TDM) partitioning.

33. The method of claim 30, wherein determining the group of subframes further comprises grouping the one or more downlink subframes that are latest in time to the one or more uplink subframes.

34. The method of claim 30, wherein determining the group of subframes further comprises determining one or more groups with a periodicity greater than a length of a radio frame.

35. The method of claim 34, further comprising suspending uplink hybrid automatic retransmission request (HARQ) transmissions when uplink transmissions of a first group fall into a second group.

36. The method of claim 30, wherein determining the group of subframes further comprises determining one or more groups with a periodicity equal to a length of a radio frame.

37. The method of claim 30, wherein the one or more uplink subframes acknowledge a downlink subframe in another group.

38. The method of claim 37, wherein the one or more uplink subframes are protected by Frequency Division Multiplexing (FDM) partitioning.

39. The method of claim 30, further comprising receiving a grant message for retransmission of uplink data on the same one or more uplink subframes.

40. The method of claim 30, wherein the uplink and downlink subframes occupy overlapping frequency ranges.

41. An apparatus for wireless communications, comprising:
means for receiving a grant message in a downlink subframe; and
based on the downlink subframe, means for determining a group of subframes from multiple groups of subframes, wherein each group from the multiple groups comprises:
  one or more downlink subframes for downlink transmissions comprising at least a downlink grant, an uplink grant, a downlink data transmission, and an acknowledgement of an uplink transmission; and
  one or more uplink subframes for an acknowledgement of a downlink transmission and an uplink data transmission,
wherein a radio frame comprises a special subframe at subframes 1 and 6, and wherein the means for determining the group of subframes from the multiple groups of subframes comprises means for determining, at least one of:
two groups over the radio frame, wherein:
a first group comprises subframes 9, 0, 1, 3, and 7; and
a second group comprises subframes 4, 5, 6, 8, and 2;
four groups over the radio frame, wherein:
a first group comprises subframes 0, 1, and 7;
a second group comprises subframes 5, 6, and 2;
a third group comprises subframes 4 and 8; and
a fourth group comprises subframes 9 and 3; and
eight groups over two radio frames, wherein:
a first group comprises subframes 0, 1, and 7 of a first radio frame;
a second group comprises subframes 5, 6, and 2 of the first radio frame;
a third group comprises subframes 4 and 8 of the first radio frame;
a fourth group comprises subframes 9 and 3 of the first radio frame;
a fifth group comprises subframes 0, 1, and 7 of a second radio frame;
a sixth group comprises subframes 5, 6, and 2 of the second radio frame;
a seventh group comprises subframes 4 and 8 of the second radio frame; and
an eighth group comprises subframes 9 and 3 of the second radio frame.

42. An apparatus for wireless communications, comprising:
at least one processor configured to receive a grant message in a downlink subframe and, based on the downlink subframe, determine a group of subframes from multiple groups of subframes, wherein each group from the multiple groups comprises:
one or more downlink subframes for downlink transmissions comprising at least a downlink grant, an uplink grant, a downlink data transmission, and an acknowledgement of an uplink transmission; and
one or more uplink subframes for an acknowledgement of a downlink transmission and an uplink data transmission,
wherein a radio frame comprises a special subframe at subframes 1 and 6, and wherein the at least one processor is further configured to determine, at least one of:
two groups over the radio frame, wherein:
a first group comprises subframes 9, 0, 1, 3, and 7; and
a second group comprises subframes 4, 5, 6, 8, and 2;
four groups over the radio frame, wherein:
a first group comprises subframes 0, 1, and 7;
a second group comprises subframes 5, 6, and 2;
a third group comprises subframes 4 and 8; and
a fourth group comprises subframes 9 and 3; and
eight groups over two radio frames, wherein:
a first group comprises subframes 0, 1, and 7 of a first radio frame;
a second group comprises subframes 5, 6, and 2 of the first radio frame;
a third group comprises subframes 4 and 8 of the first radio frame;
a fourth group comprises subframes 9 and 3 of the first radio frame;
a fifth group comprises subframes 0, 1, and 7 of a second radio frame;
a sixth group comprises subframes 5, 6, and 2 of the second radio frame;
a seventh group comprises subframes 4 and 8 of the second radio frame; and
an eighth group comprises subframes 9 and 3 of the second radio frame.

43. The apparatus of claim 42, wherein the one or more groups of subframes are determined based, at least in part, on resource partitioning information (RPI) that identifies subframes that are usable and protected due to cooperative partitioning of resources between a serving Node B and one or more non-serving Node Bs.

44. The apparatus of claim 42, wherein the one or more downlink subframes are protected by Time Division Multiplexing (TDM) partitioning.

45. The apparatus of claim 42, wherein the at least one processor is further configured to group the one or more downlink subframes that are latest in time to the one or more uplink subframes.

46. The apparatus of claim 42, wherein the one or more uplink subframes acknowledge a downlink subframe in another group.

47. The apparatus of claim 46, wherein the one or more uplink subframes are protected by Frequency Division Multiplexing (FDM) partitioning.

48. The apparatus of claim 42, wherein the at least one processor is further configured to receive a grant message for retransmission of uplink data on the same one or more uplink subframes.

49. The apparatus of claim 42, wherein the uplink and downlink subframes occupy overlapping frequency ranges.

50. A computer-program product stored on a non-transitory computer-readable medium comprising code that when executed on at least one computer performs the steps of:
receiving a grant message in a downlink subframe; and
based on the downlink subframe, determining a group of subframes from multiple groups of subframes, wherein each group from the multiple groups comprises:
one or more downlink subframes for downlink transmissions comprising at least a downlink grant, an uplink grant, a downlink data transmission, and an acknowledgement of an uplink transmission; and
one or more uplink subframes for an acknowledgement of a downlink transmission and an uplink data transmission,
wherein a radio frame comprises a special subframe at subframes 1 and 6, and wherein the determining the group of subframes from the multiple groups of subframes comprises determining, at least one of:
two groups over the radio frame, wherein:
a first group comprises subframes 9, 0, 1, 3, and 7; and
a second group comprises subframes 4, 5, 6, 8, and 2;
four groups over the radio frame, wherein:
a first group comprises subframes 0, 1, and 7;
a second group comprises subframes 5, 6, and 2;
a third group comprises subframes 4 and 8; and
a fourth group comprises subframes 9 and 3; and
eight groups over two radio frames, wherein:
a first group comprises subframes 0, 1, and 7 of a first radio frame;
a second group comprises subframes 5, 6, and 2 of the first radio frame;
a third group comprises subframes 4 and 8 of the first radio frame;
a fourth group comprises subframes 9 and 3 of the first radio frame;

a fifth group comprises subframes 0, 1, and 7 of a second radio frame;
a sixth group comprises subframes 5, 6, and 2 of the second radio frame;
a seventh group comprises subframes 4 and 8 of the second radio frame; and
an eighth group comprises subframes 9 and 3 of the second radio frame.

51. An apparatus for wireless communications, comprising:
   means for determining one or more groups of subframes, wherein each group comprises:
      one or more downlink subframes for downlink transmissions comprising at least a downlink grant, an uplink assignment, a downlink data transmission, and an acknowledgement of an uplink transmission; and
      one or more uplink subframes for an acknowledgement of a downlink transmission and an uplink data transmission; and
   means for scheduling transmissions using at least one of the groups of subframes,
   wherein a radio frame comprises a special subframe at subframe 1, and wherein the means for determining the one or more groups of subframes comprises means for determining, at least one of:
      two groups over the radio frame, wherein:
         a first group comprises subframes 0, 1, 4, 8, and 2; and
         a second group comprises subframes 5, 6, 7, 9, and 3; and
      three groups over the radio frame, wherein:
         a first group comprises subframes 1, 5, 8, and 2;
         a second group comprises subframes 6, 9, and 3; and
         a third group comprises subframes 7, 0, and 4.

52. An apparatus for wireless communications, comprising:
   means for determining one or more groups of subframes, wherein each group comprises:
      one or more downlink subframes for downlink transmissions comprising at least a downlink grant, an uplink assignment, a downlink data transmission, and an acknowledgement of an uplink transmission; and
      one or more uplink subframes for an acknowledgement of a downlink transmission and an uplink data transmission; and
   means for scheduling transmissions using at least one of the groups of subframes,
   wherein a radio frame comprises a special subframe at subframes 1 and 6, and wherein the means for determining the one or more groups of subframes comprises means for determining six groups over the radio frame, wherein the six groups are made with each associated downlink hybrid automatic retransmission request (HARQ) process and uplink HARQ process.

53. An apparatus for wireless communications, comprising:
   means for determining one or more groups of subframes, wherein each group comprises:
      one or more downlink subframes for downlink transmissions comprising at least a downlink grant, an uplink assignment, a downlink data transmission, and an acknowledgement of an uplink transmission; and
      one or more uplink subframes for an acknowledgement of a downlink transmission and an uplink data transmission; and
   means for scheduling transmissions using at least one of the groups of subframes,
   wherein a radio frame comprises less downlink subframes than uplink subframes, and wherein the means for determining the one or more groups of subframes comprises means for determining four groups over the radio frame, wherein:
      a first group comprises subframes 0 and 4;
      a second group comprises subframes 1, 7, and 8;
      a third group comprises subframes 5 and 9; and
      a fourth group comprises subframes 6, 2, and 3.

54. An apparatus for wireless communications, comprising:
   at least one processor configured to:
      determine one or more groups of subframes, wherein each group comprises:
         one or more downlink subframes for downlink transmissions comprising at least a downlink grant, an uplink assignment, a downlink data transmission, and an acknowledgement of an uplink transmission; and
         one or more uplink subframes for an acknowledgement of a downlink transmission and an uplink data transmission; and
      schedule transmissions using at least one of the groups of subframes,
      wherein a radio frame comprises a special subframe at subframe 1, and wherein the at least one processor is further configured to determine, at least one of:
         two groups over the radio frame, wherein:
            a first group comprises subframes 0, 1, 4, 8, and 2; and
            a second group comprises subframes 5, 6, 7, 9, and 3; and
         three groups over the radio frame, wherein:
            a first group comprises subframes 1, 5, 8, and 2;
            a second group comprises subframes 6, 9, and 3; and
            a third group comprises subframes 7, 0, and 4.

55. An apparatus for wireless communications, comprising:
   at least one processor configured to:
      determine one or more groups of subframes, wherein each group comprises:
         one or more downlink subframes for downlink transmissions comprising at least a downlink grant, an uplink assignment, a downlink data transmission, and an acknowledgement of an uplink transmission; and
         one or more uplink subframes for an acknowledgement of a downlink transmission and an uplink data transmission; and
      schedule transmissions using at least one of the groups of subframes,
      wherein a radio frame comprises a special subframe at subframes 1 and 6, and wherein the at least one processor is further configured to determine six groups over the radio frame, wherein the six groups are made with each associated downlink hybrid automatic retransmission request (HARQ) process and uplink HARQ process.

56. An apparatus for wireless communications, comprising:
   at least one processor configured to:
      determine one or more groups of subframes, wherein each group comprises:
         one or more downlink subframes for downlink transmissions comprising at least a downlink grant, an uplink assignment, a downlink data transmission, and an acknowledgement of an uplink transmission; and one or more uplink subframes for an acknowledgement of a downlink transmission and an uplink data transmission; and schedule transmissions using at least one of the groups of subframes, wherein a radio frame comprises less downlink subframes than uplink subframes, and wherein the at least one processor is further configured to determine four groups over the radio frame, wherein:

a first group comprises subframes 0 and 4;
a second group comprises subframes 1, 7, and 8;
a third group comprises subframes 5 and 9; and
a fourth group comprises subframes 6, 2, and 3.

57. A computer-program product stored on a non-transitory computer-readable medium comprising code that when executed on at least one computer performs the steps of:

determining one or more groups of subframes, wherein each group comprises:

one or more downlink subframes for downlink transmissions comprising at least a downlink grant, an uplink assignment, a downlink data transmission, and an acknowledgement of an uplink transmission; and one or more uplink subframes for an acknowledgement of a downlink transmission and an uplink data transmission; and scheduling transmissions using at least one of the groups of subframes, wherein a radio frame comprises a special subframe at subframe 1, and wherein the determining the one or more groups of subframes comprises determining, at least one of:

two groups over the radio frame, wherein:
a first group comprises subframes 0, 1, 4, 8, and 2; and
a second group comprises subframes 5, 6, 7, 9, and 3; and three groups over the radio frame, wherein:
a first group comprises subframes 1, 5, 8, and 2;
a second group comprises subframes 6, 9, and 3; and
a third group comprises subframes 7, 0, and 4.

58. A computer-program product stored on a non-transitory computer-readable medium comprising code that when executed on at least one computer performs the steps of:

determining one or more groups of subframes, wherein each group comprises:

one or more downlink subframes for downlink transmissions comprising at least a downlink grant, an uplink assignment, a downlink data transmission, and an acknowledgement of an uplink transmission; and one or more uplink subframes for an acknowledgement of a downlink transmission and an uplink data transmission; and scheduling transmissions using at least one of the groups of subframes, wherein a radio frame comprises a special subframe at subframes 1 and 6, and wherein the determining the one or more groups of subframes comprises determining six groups over the radio frame, wherein the six groups are made with each associated downlink hybrid automatic retransmission request (HARQ) process and uplink HARQ process.

59. A computer-program product stored on a non-transitory computer-readable medium comprising code that when executed on at least one computer performs the steps of:

determining one or more groups of subframes, wherein each group comprises:

one or more downlink subframes for downlink transmissions comprising at least a downlink grant, an uplink assignment, a downlink data transmission, and an acknowledgement of an uplink transmission; and one or more uplink subframes for an acknowledgement of a downlink transmission and an uplink data transmission; and scheduling transmissions using at least one of the groups of subframes, wherein a radio frame comprises less downlink subframes than uplink subframes, and wherein the determining the one or more groups of subframes comprises determining four groups over the radio frame, wherein:

a first group comprises subframes 0 and 4;
a second group comprises subframes 1, 7, and 8;
a third group comprises subframes 5 and 9; and
a fourth group comprises subframes 6, 2, and 3.

60. A method for wireless communications, comprising:

receiving a grant message in a downlink subframe; and based on the downlink subframe, determining a group of subframes from multiple groups of subframes, wherein each group from the multiple groups comprises:

one or more downlink subframes for downlink transmissions comprising at least a downlink grant, an uplink grant, a downlink data transmission, and an acknowledgement of an uplink transmission; and one or more uplink subframes for an acknowledgement of a downlink transmission and an uplink data transmission, wherein a radio frame comprises a special subframe at subframe 1, and wherein determining the group of subframes from the multiple groups of subframes comprises determining, at least one of:

two groups over the radio frame, wherein:
a first group comprises subframes 0, 1, 4, 8, and 2; and
a second group comprises subframes 5, 6, 7, 9, and 3; and three groups over the radio frame, wherein:
a first group comprises subframes 1, 5, 8, and 2;
a second group comprises subframes 6, 9, and 3; and
a third group comprises subframes 7, 0, and 4.

61. A method for wireless communications, comprising:

receiving a grant message in a downlink subframe; and based on the downlink subframe, determining a group of subframes from multiple groups of subframes, wherein each group from the multiple groups comprises:

one or more downlink subframes for downlink transmissions comprising at least a downlink grant, an uplink grant, a downlink data transmission, and an acknowledgement of an uplink transmission; and one or more uplink subframes for an acknowledgement of a downlink transmission and an uplink data transmission, wherein a radio frame comprises a special subframe at subframes 1 and 6, and wherein determining the group of subframes from the multiple groups of subframes comprises determining six groups over the radio frame, wherein the six groups are made with each associated downlink hybrid automatic retransmission request (HARQ) process and uplink HARQ process.

62. A method for wireless communications, comprising:

receiving a grant message in a downlink subframe; and based on the downlink subframe, determining a group of subframes from multiple groups of subframes, wherein each group from the multiple groups comprises:

one or more downlink subframes for downlink transmissions comprising at least a downlink grant, an uplink grant, a downlink data transmission, and an acknowledgement of an uplink transmission; and one or more uplink subframes for an acknowledgement of a downlink transmission and an uplink data transmission, wherein a radio frame comprises less downlink subframes than uplink subframes, and wherein the determining the group of subframes from the multiple groups of subframes comprises determining four groups over the radio frame, wherein:

a first group comprises subframes 0 and 4;
a second group comprises subframes 1, 7, and 8;
a third group comprises subframes 5 and 9; and
a fourth group comprises subframes 6, 2, and 3.

63. An apparatus for wireless communications, comprising:

means for receiving a grant message in a downlink subframe; and based on the downlink subframe, means for determining a group of subframes from multiple groups of subframes, wherein each group from the multiple groups comprises:

one or more downlink subframes for downlink transmissions comprising at least a downlink grant, an uplink grant, a downlink data transmission, and an acknowledgement of an uplink transmission; and one or more uplink subframes for an acknowledgement of a downlink transmission and an uplink data transmission, wherein a radio frame comprises a special subframe at subframe 1, and wherein the means for determining the group of subframes from the multiple groups of subframes comprises means for determining, at least one of:

two groups over the radio frame, wherein:
a first group comprises subframes 0, 1, 4, 8, and 2; and
a second group comprises subframes 5, 6, 7, 9, and 3; and three groups over the radio frame, wherein:
a first group comprises subframes 1, 5, 8, and 2;
a second group comprises subframes 6, 9, and 3; and
a third group comprises subframes 7, 0, and 4.

64. An apparatus for wireless communications, comprising:

means for receiving a grant message in a downlink subframe; and based on the downlink subframe, means for determining a group of subframes from multiple groups of subframes, wherein each group from the multiple groups comprises:

one or more downlink subframes for downlink transmissions comprising at least a downlink grant, an uplink grant, a downlink data transmission, and an acknowledgement of an uplink transmission; and one or more uplink subframes for an acknowledgement of a downlink transmission and an uplink data transmission, wherein a radio frame comprises a special subframe at subframes 1 and 6, and wherein the means for determining the group of subframes from the multiple groups of subframes comprises means for determining six groups over the radio frame, wherein the six groups are made with each associated downlink hybrid automatic retransmission request (HARQ) process and uplink HARQ process.

65. An apparatus for wireless communications, comprising:

means for receiving a grant message in a downlink subframe; and based on the downlink subframe, means for determining a group of subframes from multiple groups of subframes, wherein each group from the multiple groups comprises:

one or more downlink subframes for downlink transmissions comprising at least a downlink grant, an uplink grant, a downlink data transmission, and an acknowledgement of an uplink transmission; and one or more uplink subframes for an acknowledgement of a downlink transmission and an uplink data transmission, wherein a radio frame comprises less downlink subframes than uplink subframes, and wherein the means for determining the group of subframes from the multiple groups of subframes comprises means for determining four groups over the radio frame, wherein:

a first group comprises subframes 0 and 4;
a second group comprises subframes 1, 7, and 8;
a third group comprises subframes 5 and 9; and
a fourth group comprises subframes 6, 2, and 3.

66. An apparatus for wireless communications, comprising:

at least one processor configured to receive a grant message in a downlink subframe and, based on the downlink subframe, determine a group of subframes from multiple groups of subframes, wherein each group from the multiple groups comprises:

one or more downlink subframes for downlink transmissions comprising at least a downlink grant, an uplink grant, a downlink data transmission, and an acknowledgement of an uplink transmission; and one or more uplink subframes for an acknowledgement of a downlink transmission and an uplink data transmission, wherein a radio frame comprises a special subframe at subframe 1, and wherein the at least one processor is further configured to determine, at least one of:

two groups over the radio frame, wherein:
a first group comprises subframes 0, 1, 4, 8, and 2; and
a second group comprises subframes 5, 6, 7, 9, and 3; and three groups over the radio frame, wherein:
a first group comprises subframes 1, 5, 8, and 2;
a second group comprises subframes 6, 9, and 3; and
a third group comprises subframes 7, 0, and 4.

67. An apparatus for wireless communications, comprising:

at least one processor configured to receive a grant message in a downlink subframe and, based on the downlink subframe, determine a group of subframes from multiple groups of subframes, wherein each group from the multiple groups comprises:

one or more downlink subframes for downlink transmissions comprising at least a downlink grant, an uplink grant, a downlink data transmission, and an acknowledgement of an uplink transmission; and one or more uplink subframes for an acknowledgement of a downlink transmission and an uplink data transmission, wherein a radio frame comprises a special subframe at subframes 1 and 6, and wherein the at least one processor is further configured to determine six groups over the radio frame, wherein the six groups are made with each associated downlink hybrid automatic retransmission request (HARQ) process and uplink HARQ process.

68. An apparatus for wireless communications, comprising:
at least one processor configured to receive a grant message in a downlink subframe and, based on the downlink subframe, determine a group of subframes from multiple groups of subframes, wherein each group from the multiple groups comprises:
one or more downlink subframes for downlink transmissions comprising at least a downlink grant, an uplink grant, a downlink data transmission, and an acknowledgement of an uplink transmission; and
one or more uplink subframes for an acknowledgement of a downlink transmission and an uplink data transmission,
wherein a radio frame comprises less downlink subframes than uplink subframes, and wherein the at least one processor is further configured to determine four groups over the radio frame, wherein:
a first group comprises subframes 0 and 4;
a second group comprises subframes 1, 7, and 8;
a third group comprises subframes 5 and 9; and
a fourth group comprises subframes 6, 2, and 3.

69. A computer-program product stored on a non-transitory computer-readable medium comprising code that when executed on at least one computer performs the steps of:
receiving a grant message in a downlink subframe; and
based on the downlink subframe, determining a group of subframes from multiple groups of subframes, wherein each group from the multiple groups comprises:
one or more downlink subframes for downlink transmissions comprising at least a downlink grant, an uplink grant, a downlink data transmission, and an acknowledgement of an uplink transmission; and
one or more uplink subframes for an acknowledgement of a downlink transmission and an uplink data transmission,
wherein a radio frame comprises a special subframe at subframe 1, and wherein the determining the group of subframes from the multiple groups of subframes comprises determining, at least one of:
two groups over the radio frame, wherein:
a first group comprises subframes 0, 1, 4, 8, and 2; and
a second group comprises subframes 5, 6, 7, 9, and 3; and
three groups over the radio frame, wherein:
a first group comprises subframes 1, 5, 8, and 2;
a second group comprises subframes 6, 9, and 3; and
a third group comprises subframes 7, 0, and 4.

70. A computer-program product stored on a non-transitory computer-readable medium comprising code that when executed on at least one computer performs the steps of:
receiving a grant message in a downlink subframe; and
based on the downlink subframe, determining a group of subframes from multiple groups of subframes, wherein each group from the multiple groups comprises:
one or more downlink subframes for downlink transmissions comprising at least a downlink grant, an uplink grant, a downlink data transmission, and an acknowledgement of an uplink transmission; and
one or more uplink subframes for an acknowledgement of a downlink transmission and an uplink data transmission,
wherein a radio frame comprises a special subframe at subframes 1 and 6, and wherein the determining the group of subframes from the multiple groups of subframes comprises determining six groups over the radio frame, wherein the six groups are made with each associated downlink hybrid automatic retransmission request (HARQ) process and uplink HARQ process.

71. A computer-program product stored on a non-transitory computer-readable medium comprising code that when executed on at least one computer performs the steps of:
receiving a grant message in a downlink subframe; and
based on the downlink subframe, determining a group of subframes from multiple groups of subframes, wherein each group from the multiple groups comprises:
one or more downlink subframes for downlink transmissions comprising at least a downlink grant, an uplink grant, a downlink data transmission, and an acknowledgement of an uplink transmission; and
one or more uplink subframes for an acknowledgement of a downlink transmission and an uplink data transmission,
wherein a radio frame comprises less downlink subframes than uplink subframes, and wherein the determining the group of subframes from the multiple groups of subframes comprises determining four groups over the radio frame, wherein:
a first group comprises subframes 0 and 4;
a second group comprises subframes 1, 7, and 8;
a third group comprises subframes 5 and 9; and
a fourth group comprises subframes 6, 2, and 3.

* * * * *